US012713151B2

(12) United States Patent
Saruwatari et al.

(10) Patent No.: US 12,713,151 B2
(45) Date of Patent: Aug. 18, 2026

(54) IMAGING ELEMENT AND IMAGING DEVICE

(71) Applicants: NIKON CORPORATION, Tokyo (JP); TOHOKU UNIVERSITY, Sendai (JP)

(72) Inventors: Osamu Saruwatari, Yokohama (JP); Daiki Ogura, Tokyo (JP); Rihito Kuroda, Sendai (JP)

(73) Assignees: NIKON CORPORATION, Tokyo (JP); TOHOKU UNIVERSITY, Sendai (JP)

( * ) Notice: Subject to any disclaimer, the term of this patent is extended or adjusted under 35 U.S.C. 154(b) by 122 days.

(21) Appl. No.: 18/574,541

(22) PCT Filed: Jun. 24, 2022

(86) PCT No.: PCT/JP2022/025392

§ 371 (c)(1),
(2) Date: Apr. 16, 2024

(87) PCT Pub. No.: WO2023/276899

PCT Pub. Date: Jan. 5, 2023

(65) Prior Publication Data

US 2025/0133306 A1 Apr. 24, 2025

(30) Foreign Application Priority Data

Jun. 28, 2021 (JP) ................................ 2021-107083

(51) Int. Cl.
*H04N 25/706* (2023.01)

(52) U.S. Cl.
CPC ................................ *H04N 25/706* (2023.01)

(58) Field of Classification Search
CPC .. H04N 25/706; H04N 25/616; H04N 25/771; H04N 25/79; H04N 25/00;
(Continued)

(56) References Cited

U.S. PATENT DOCUMENTS

2006/0192870 A1 8/2006 Shoho et al.
2017/0272678 A1* 9/2017 Sakakibara ........... H10F 39/182
(Continued)

FOREIGN PATENT DOCUMENTS

JP 2006229334 A 8/2006
JP WO2016/009832 A1 4/2017
(Continued)

OTHER PUBLICATIONS

Nov. 5, 2024, Office Action issued in Japanese Patent Application No. 2023-531909.
(Continued)

*Primary Examiner* — Albert H Cutler
(74) *Attorney, Agent, or Firm* — Oliff PLC

(57) ABSTRACT

An imaging element includes a photoelectric conversion part configured to convert light into charges, an accumulation part in which the charges from the photoelectric conversion part are accumulated, a transfer path part which is a transfer path for transferring charges from the photoelectric conversion part to the accumulation part and has a lower potential than a pixel separation region formed around the photoelectric conversion part, and a measurement part configured to measure the number of times a predetermined amount of charges is accumulated in the accumulation part and to measure the amount of charges accumulated in the photoelectric conversion part.

22 Claims, 28 Drawing Sheets

(58) Field of Classification Search
CPC ........ H04N 25/50; H04N 25/53; H04N 25/59; H04N 25/70; H04N 25/76; H04N 25/77; H04N 25/772; H04N 25/78; H10F 39/12; H10F 39/18; H10F 39/807; H10F 39/1865; H10F 39/186; H10F 39/194; H10F 39/1945
See application file for complete search history.

(56) References Cited

U.S. PATENT DOCUMENTS

| | | | | |
|---|---|---|---|---|
| 2017/0345853 | A1* | 11/2017 | Kato | G02B 7/34 |
| 2018/0190709 | A1* | 7/2018 | Lee | H04N 25/76 |
| 2019/0141270 | A1 | 5/2019 | Otaka et al. | |
| 2019/0319061 | A1* | 10/2019 | Liu | H04N 25/59 |
| 2020/0007798 | A1* | 1/2020 | Liu | G01J 1/44 |
| 2020/0260032 | A1* | 8/2020 | Niwa | H10F 39/803 |
| 2020/0273903 | A1 | 8/2020 | Taruki et al. | |
| 2020/0396401 | A1* | 12/2020 | Chu | H04N 25/59 |
| 2021/0134865 | A1* | 5/2021 | Shim | H10F 39/80377 |

FOREIGN PATENT DOCUMENTS

| | | | |
|---|---|---|---|
| JP | 2019-087853 | A | 6/2019 |
| JP | 2020-057884 | A | 4/2020 |
| JP | 2020-141029 | A | 9/2020 |
| WO | 2016/009832 | A1 | 1/2016 |
| WO | 2019/167295 | A1 | 9/2019 |

OTHER PUBLICATIONS

Aug. 30, 2022 International Search Report issued in International Patent Application No. PCT/JP2022/025392.

Aug. 30, 2022 Written Opinion issued in International Patent Application No. PCT/JP2022/025392.

May 13, 2025 Office Action issued in Japanese Patent Application No. 2023-531909.

Dec. 2, 2025 Decision of Dismissal of Amendment issued in Japanese Patent Application No. 2023-531909.

* cited by examiner

Figure 2:
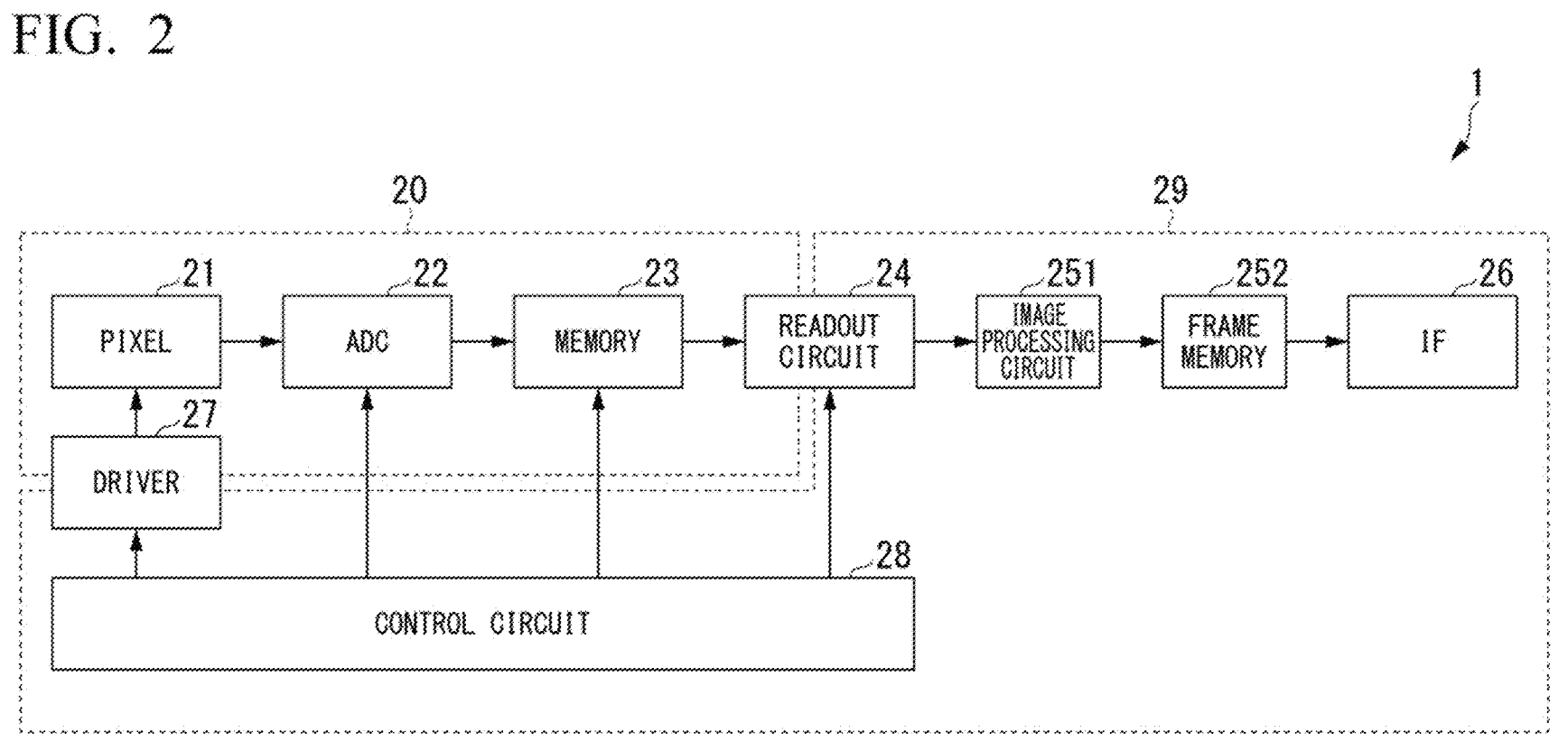

252 FRAME MEMORY

251 IMAGE PROCESSING CIRCUIT

24 READOUT CIRCUIT

28

23 MEMORY

20

22 ADC

21 PIXEL

27 DRIVER

CONTROL CIRCUIT 20
21
211
212
213
PD
TX
FD
ITX
22
222
RAMP
2211
221
2212
223
2231
2232
2233
DELAY
IFDR
225
224
SELECTION CIRCUIT
IS
23
231
PFM COUNTER
232
SS REF LATCH
233
SS SIG LATCH
241
28
CONTROL CIRCUIT
CNT1
CNT2
251
IMAGE PROCESSING CIRCUIT (A)
221
$V_{REF}$
221p
2212
OUTPUT
INPUT
221n
2211
(B)
1.2
1
0.8
0.6
0.4
0.2
0
OUTPUT [V]
0
0.2
0.4
0.6
0.8
1
1.2
INPUT [V]
(C)
221A
221p
2211
INPUT
2212
OUTPUT
221n
(D)
221B
2215
2216
2212
OUTPUT
2211
INPUT
$V_{REF}$
2217
2219
2218
(E)
221C
2215
2216
2212
OUTPUT
2211
INPUT
RAMP
2217
2219
2218

FIG. 5

(A)
CROSS-SECTIONAL VIEW OF PIXEL
21
31
32
33
34
FD
A
A'
(B)
POTENTIAL
POTENTIAL
E6
E5
E4
E3
E2
E1
POSITION
PIXEL SEPARATION REGION
PHOTOELECTRIC CONVERSION REGION
ACCUMULATION REGION
TRANSFER PATH REGION

FIG. 10
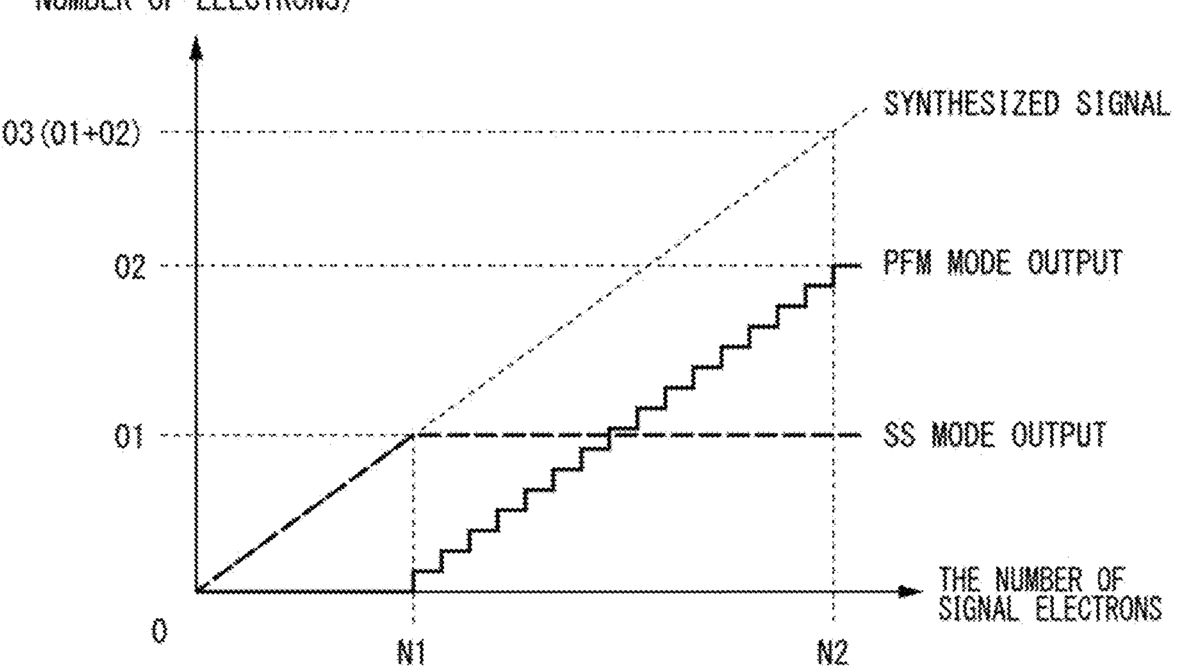

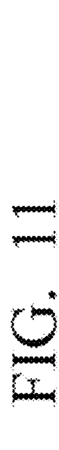
FIG. 11
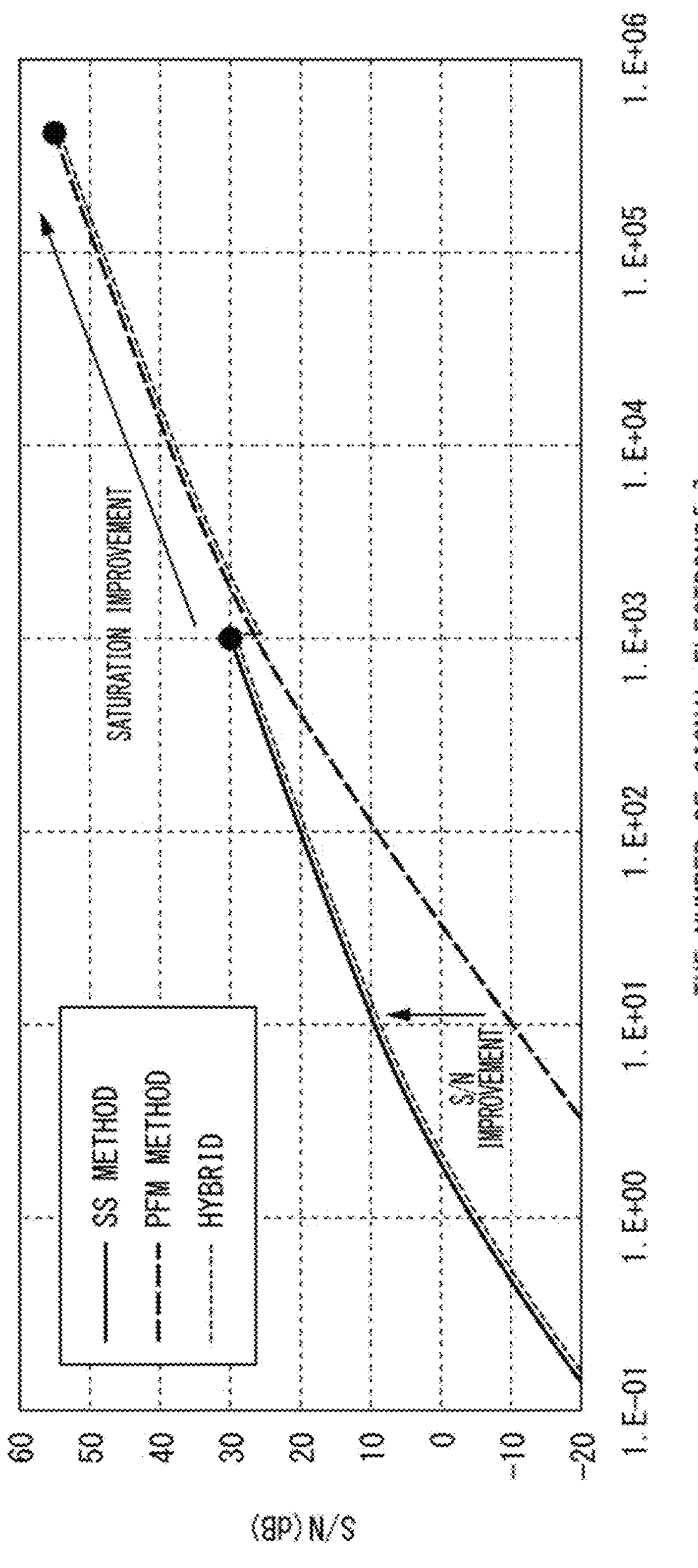

20A
28
CONTROL CIRCUIT
241
CNT1
CNT2
IMAGE PROCESSING CIRCUIT
251
23
231
PFM COUNTER
232
SS REF LATCH
233
SS SIG LATCH
22A
223
2233
DELAY
224
SELECTION CIRCUIT
IS
IFDR
2232
225
2231
2234
IFDR2
2212
221
2211
$V_{RST}$
2132
FD2
222
RAMP
21
ITX
212
TX
FD1
2131
211
PD

Figure 16:
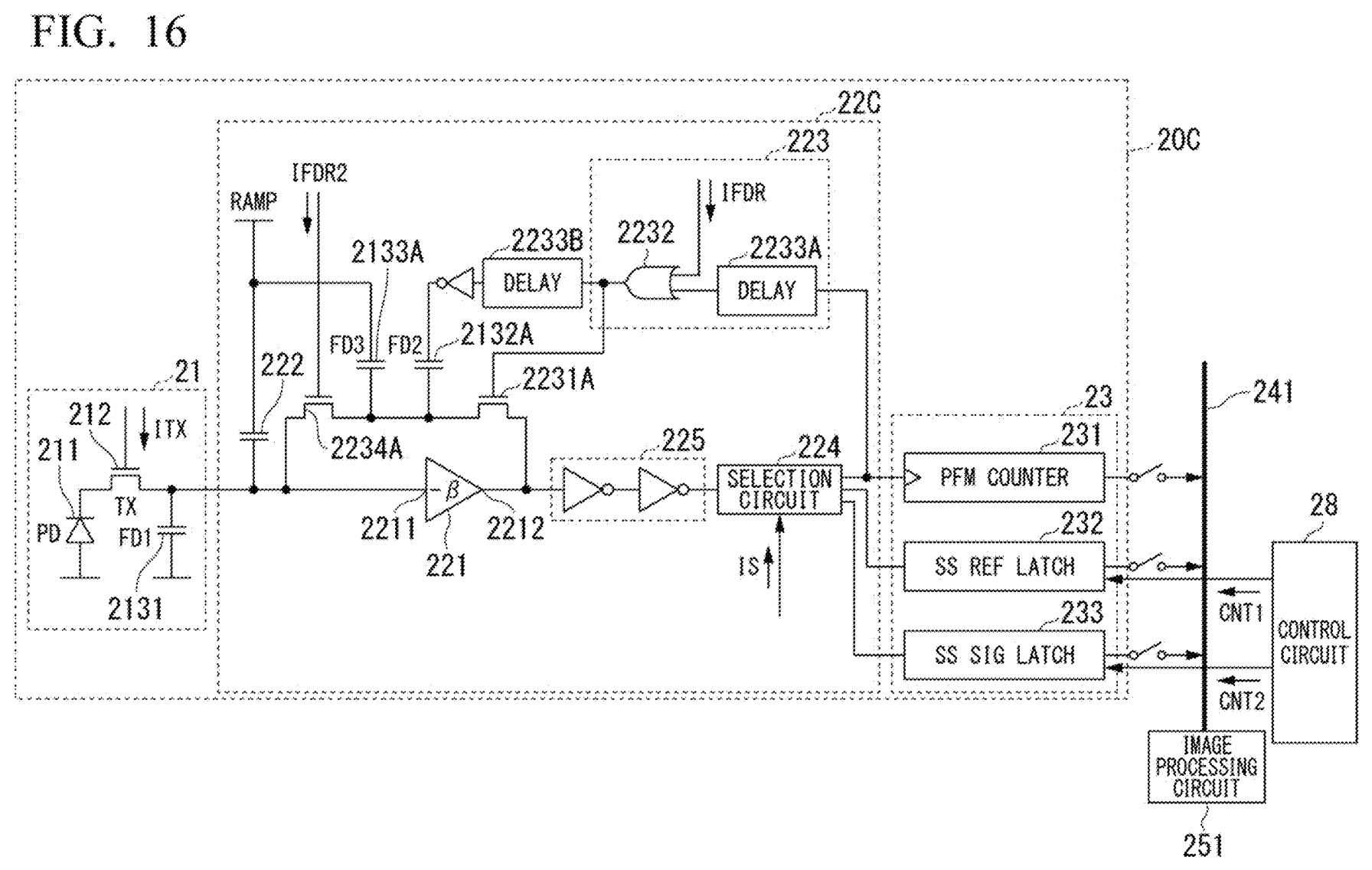

CONTROL CIRCUIT
28
241
CNT1
CNT2
IMAGE PROCESSING CIRCUIT
251
20C
23
231
PFM COUNTER
232
SS REF LATCH
233
SS SIG LATCH
22C
223
2233A
DELAY
IFDR
2232
224
SELECTION CIRCUIT
IS
225
2233B
DELAY
2231A
2132A
2212
221
β
2211
FD2
2133A
FD3
2234A
IFDR2
RAMP
222
21
ITX
212
TX
FD1
2131
211
PD

FIG. 20

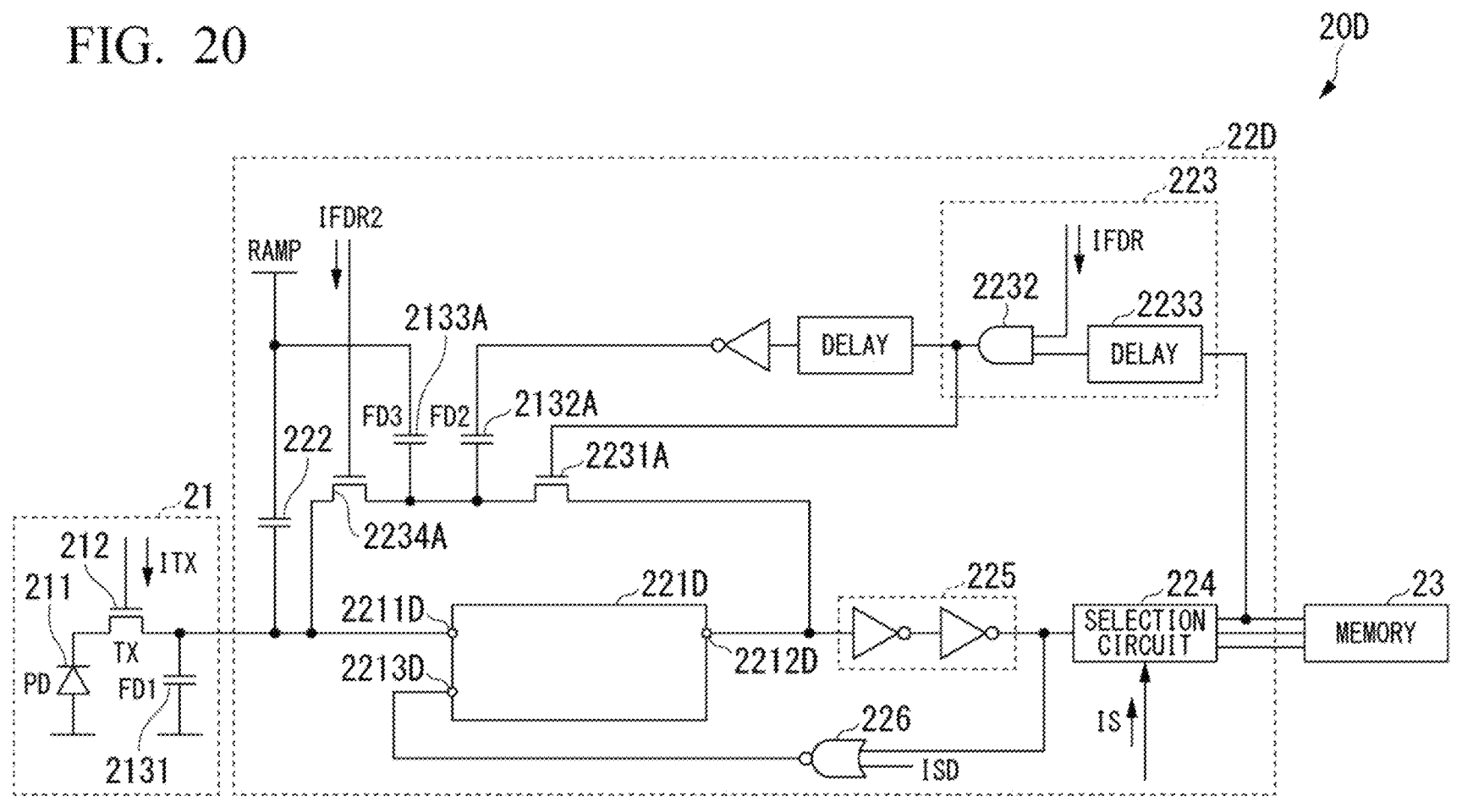

20D
22D
23
MEMORY
223
2233
DELAY
IFDR
2232
224
SELECTION CIRCUIT
IS
225
DELAY
226
ISD
2212D
221D
2231A
2132A
2133A
FD2
FD3
2234A
IFDR2
RAMP
222
2211D
2213D
21
ITX
TX
FD1
2131
212
211
PD

ITX
IFDR
IFDR2
RAMP VOLTAGE
FD VOLTAGE
INVERSION THRESHOLD
COMPARATOR OUTPUT
REF LATCH VALUE
SIG LATCH VALUE
ISD
CURRENT CUTOFF SW INPUT
High:CUTOFF
COMPARATOR CURRENT
TIME
t40
t41
t42
t43
t44
t45

Figure 25:
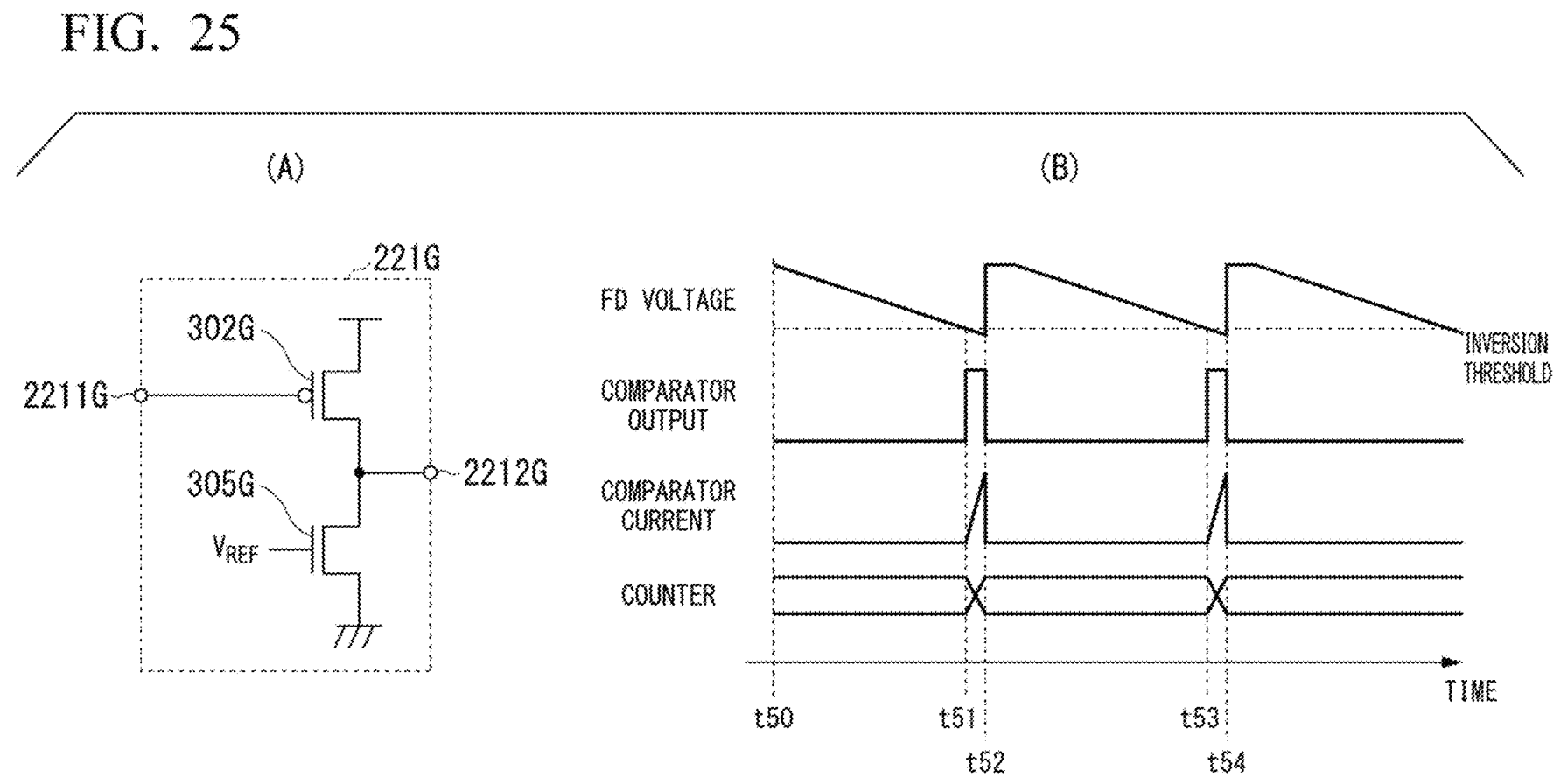

221G
2211G
2212G
302G
305G
$V_{REF}$ (B)

INVERSION THRESHOLD
FD VOLTAGE
COMPARATOR OUTPUT
COMPARATOR CURRENT
COUNTER
TIME
t50
t51
t52
t53
t54

Figure 26:
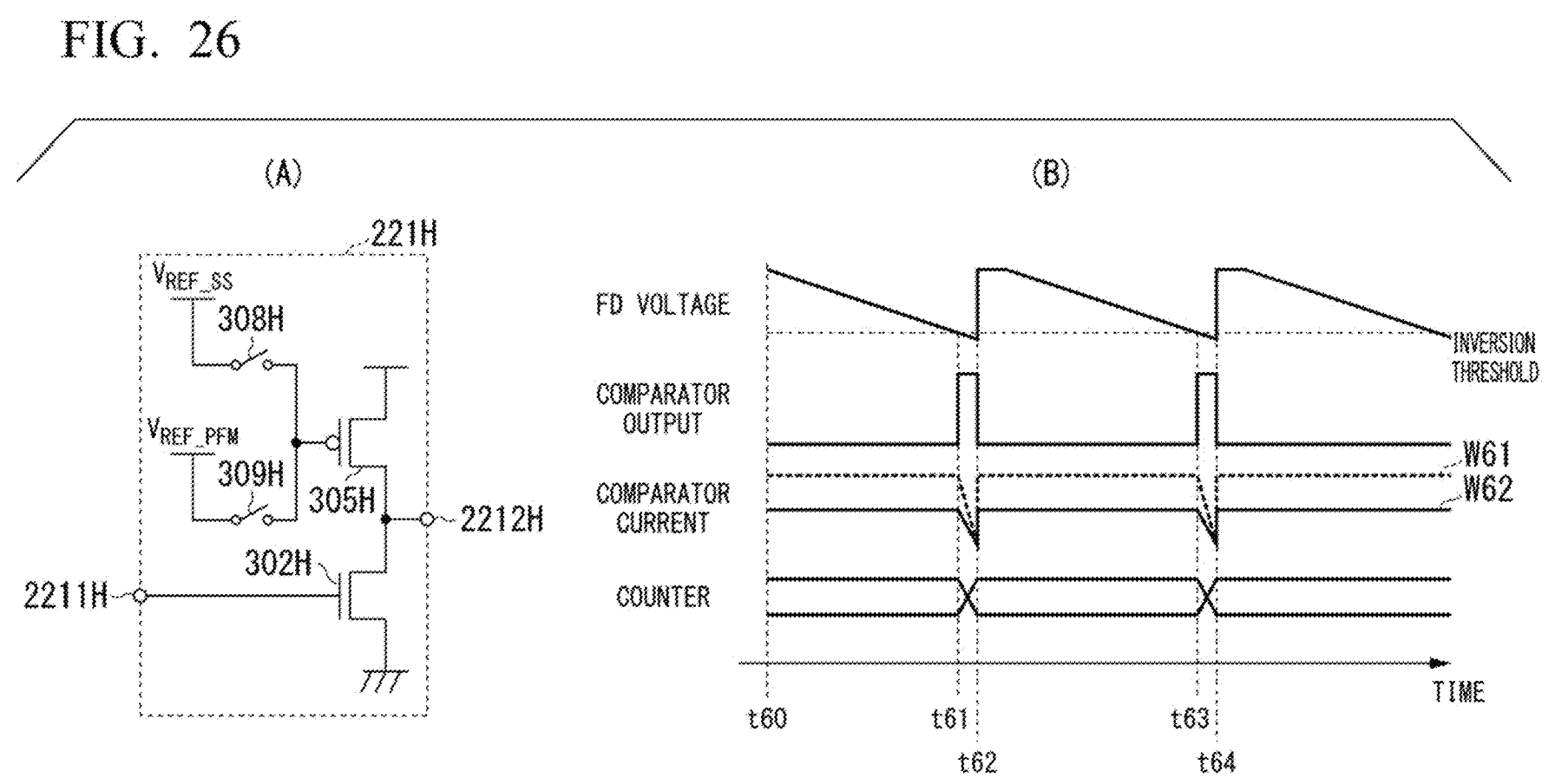

221H
$V_{REF\_SS}$
308H
$V_{REF\_PFM}$
309H
305H
302H
2212H
2211H (B)

FD VOLTAGE
INVERSION THRESHOLD
COMPARATOR OUTPUT
COMPARATOR CURRENT
W61
W62
COUNTER
TIME
t60
t61
t62
t63
t64

60 clk
toggle_enable
data1_io
data1_io
latch1_hiz
latch1_hiz
D1
data2_io
data2_io
latch2_hiz
latch2_hiz
D2
Q

Figure 31:
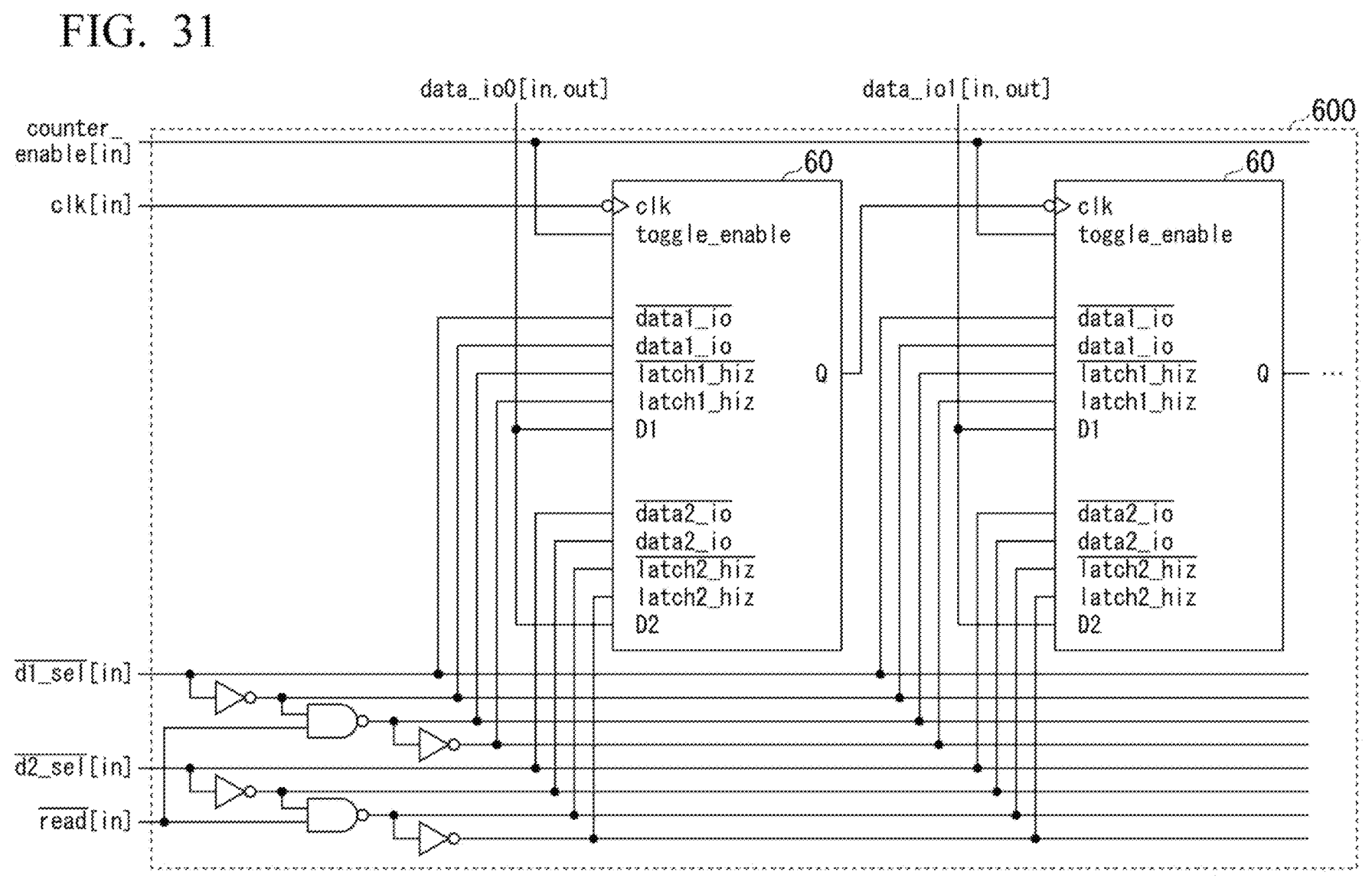

60 clk
toggle_enable
data1_io
data1_io
latch1_hiz
latch1_hiz
D1
data2_io
data2_io
latch2_hiz
latch2_hiz
D2
Q data_io0[in,out]
data_io1[in,out]
counter_enable[in]
clk[in]
d1_sel[in]
d2_sel[in]
read[in]

IMAGING ELEMENT AND IMAGING DEVICE

TECHNICAL FIELD

The present invention relates to an imaging element and an imaging device.

Priority is claimed on Japanese Patent Application No. 2021-107083, filed Jun. 28, 2021, the content of which is incorporated herein by reference.

BACKGROUND ART

Conventionally, in an image sensor used in an imaging device (for example, a digital camera) having an imaging function, a technique in which a photoelectric conversion film and a readout circuit that reads out charges generated by the photoelectric conversion film are stacked has been proposed (for example, refer to Patent Document 1).

However, in the image sensor described above, when the charges generated by the photoelectric conversion film are read out, the number of saturation electrons decreases when the capacitance of an accumulation part is small, and the readout noise increases when the capacitance of the accumulation part is large.

CITATION LIST

Patent Document

[Patent Document 1]

Republished Japanese Translation No. WO2016/009832 of the PCT International Publication for Patent Applications

SUMMARY OF INVENTION

Technical Problem

An imaging element according to the present invention includes a photoelectric conversion part configured to convert light into charges, an accumulation part in which the charges from the photoelectric conversion part are accumulated, a transfer path part which is a transfer path for transferring charges from the photoelectric conversion part to the accumulation part and has a lower potential than a pixel separation region formed around the photoelectric conversion part, and a measurement part configured to measure the number of times a predetermined amount of charges is accumulated in the accumulation part.

BRIEF DESCRIPTION OF DRAWINGS

FIG. 2 is a diagram showing an example of a functional configuration of the imaging element according to the embodiment of the present invention.

FIG. 5 is a diagram showing a modified example of the circuit configuration of the comparator according to the embodiment of the present invention.

FIG. 10 is a diagram showing a relationship between the number of signal electrons and an output value according to the embodiment of the present invention.

FIG. 11 is a diagram showing a relationship between the number of signal electrons and an S/N ratio according to the embodiment of the present invention.

FIG. 15 is a diagram showing a modified example of the functional configuration of the circuit for each pixel included in the imaging element according to the second embodiment of the present invention.

FIG. 16 is a diagram showing a second modified example of the functional configuration of the circuit for each pixel included in the imaging element according to the second embodiment of the present invention.

FIG. 20 is a diagram showing an example of a functional configuration of a circuit for each pixel included in an imaging element according to a third embodiment of the present invention.

FIG. 25 is a diagram showing an example of a comparator according to a fifth embodiment of the present invention.

FIG. 26 is a diagram showing a modified example of the comparator according to the fifth embodiment of the present invention.

FIG. 31 is a diagram showing an overall configuration of the shared memory according to the seventh embodiment of the present invention.

DESCRIPTION OF EMBODIMENTS

First Embodiment

Figure 1:
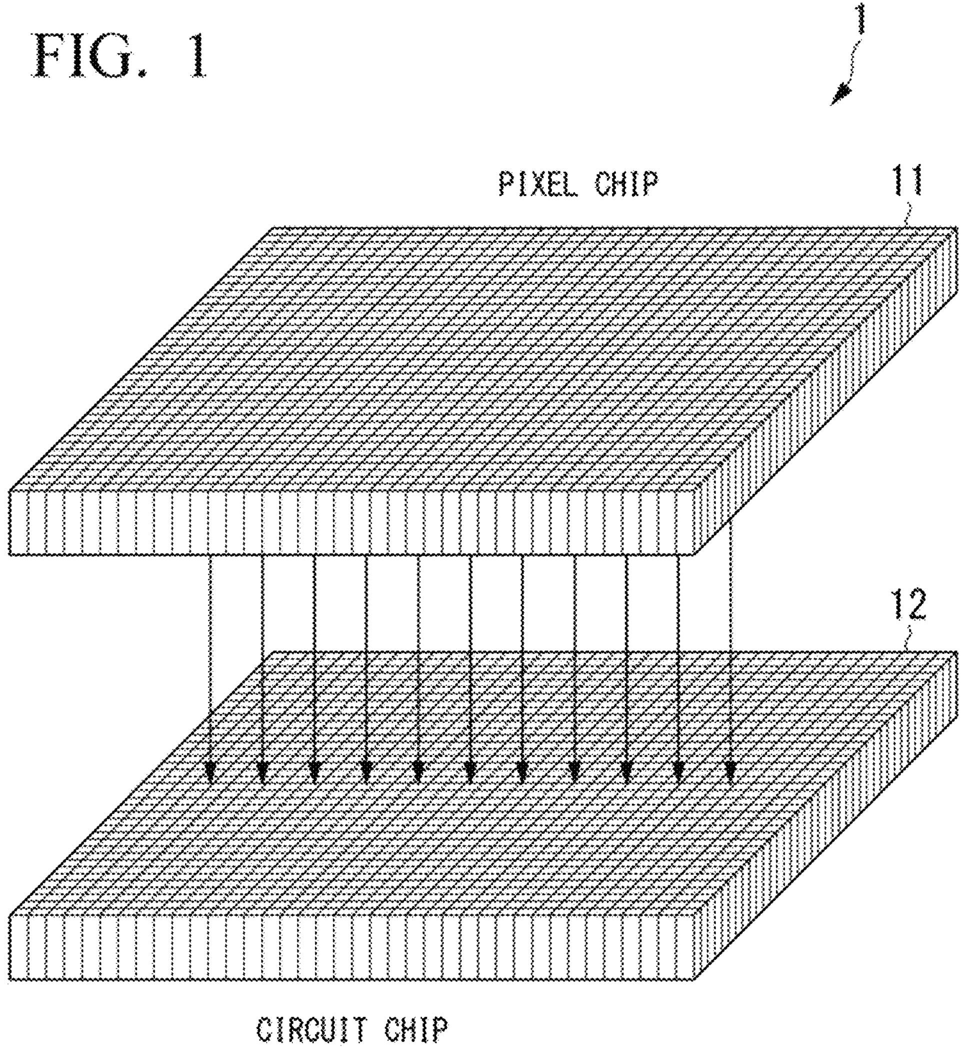
FIG. 1 is a diagram showing an example of a configuration of an imaging element according to an embodiment of the present invention.

Hereinafter, one embodiment of the present invention will be described with reference to the drawings. FIG. 1 is a diagram showing an example of a configuration of an imaging element 1 according to an embodiment of the present invention.

The imaging element 1 is included in an imaging device, captures a subject image, and generates pixel data of the captured image.

The imaging element 1 includes a pixel chip 11 and a circuit chip 12.

The pixel chip 11 includes a plurality of pixels 21. The plurality of pixels 21 are arranged in row and column directions and are disposed in a two-dimensional array. Each of the pixels 21 included in the pixel chip 11 generates charges according to the amount of incident light.

The circuit chip 12 includes a readout circuit for each pixel that reads out the amount of charges generated by each of the pixels 21.

In this embodiment, the pixel chip 11 and the circuit chip 12 are electrically connected for each pixel.

FIG. 2 is a diagram showing an example of a functional configuration of the imaging element 1 according to the embodiment of the present invention. The example of the functional configuration of the imaging element 1 will be described with reference to the drawing.

The imaging element 1 includes a pixel 21, an analog to digital converter (ADC) 22, a memory 23, a readout circuit 24, an image processing circuit 251, a frame memory 252, an interface (IF) 26, a driver 27, and a control circuit 28 as functions thereof.

The pixel 21, the ADC 22, and the memory 23 are a circuit 20 for each pixel that the imaging element 1 includes for each of the pixels 21, and the image processing circuit 251, the frame memory 252, the IF 26, and the control circuit 28 constitute a circuit 29 for each element provided for each of the imaging elements 1. A part of each of the readout circuit 24 and the driver 27 is provided for each of the pixels 21, and the other part is provided for each of the imaging elements 1.

The pixel 21 includes a photodiode. The photodiode included in the pixel 21 generates charges according to the amount of incident light. The pixel 21 outputs a voltage value corresponding to the amount of charges generated by the photodiode to the ADC 22.

The ADC 22 generates a digital value corresponding to the amount of charges based on the voltage value (an analog value) indicating the amount of charges input from the pixel 21. The ADC 22 outputs a converted value to the memory 23. In this embodiment, the ADC 22 is provided for each of the pixels 21.

The memory 23 stores a value indicating the amount of charges input from the ADC 22. In this embodiment, the memory 23 is provided for each of the pixels 21.

The readout circuit 24 acquires a value indicating the amount of charges stored in the memory 23. The readout circuit 24 outputs the acquired value to the image processing circuit 251.

The image processing circuit 251 stores values acquired from the memory 23 provided for each of the pixels 21 in the frame memory 252 for each frame as image data. The image processing circuit 251 and the frame memory 252 are provided for each of the imaging elements 1.

The IF 26 outputs the image data stored in the frame memory 252 through a predetermined interface.

The driver 27 drives the pixel 21 based on a signal from the control circuit 28 or the ADC 22. The driver 27 controls, for example, a time during which light is incident on the pixel 21. The driver 27 also reads out the charges stored in each of the pixels 21 by controlling the pixels 21.

The control circuit 28 controls the pixel 21, the ADC 22, the memory 23, the readout circuit 24, and the driver 27. The control circuit 28 controls the pixel 21, the ADC 22, the memory 23, the readout circuit 24, and the driver 27 to output image data for each frame to the image processing circuit 251. Furthermore, the control circuit 28 drives the plurality of pixels 21, the ADC 22, and the memory 23 simultaneously for all pixels, thereby performing accumulation of charges in the pixels 21 simultaneously for all the pixels (that is, a global shutter operation).

Figure 3:
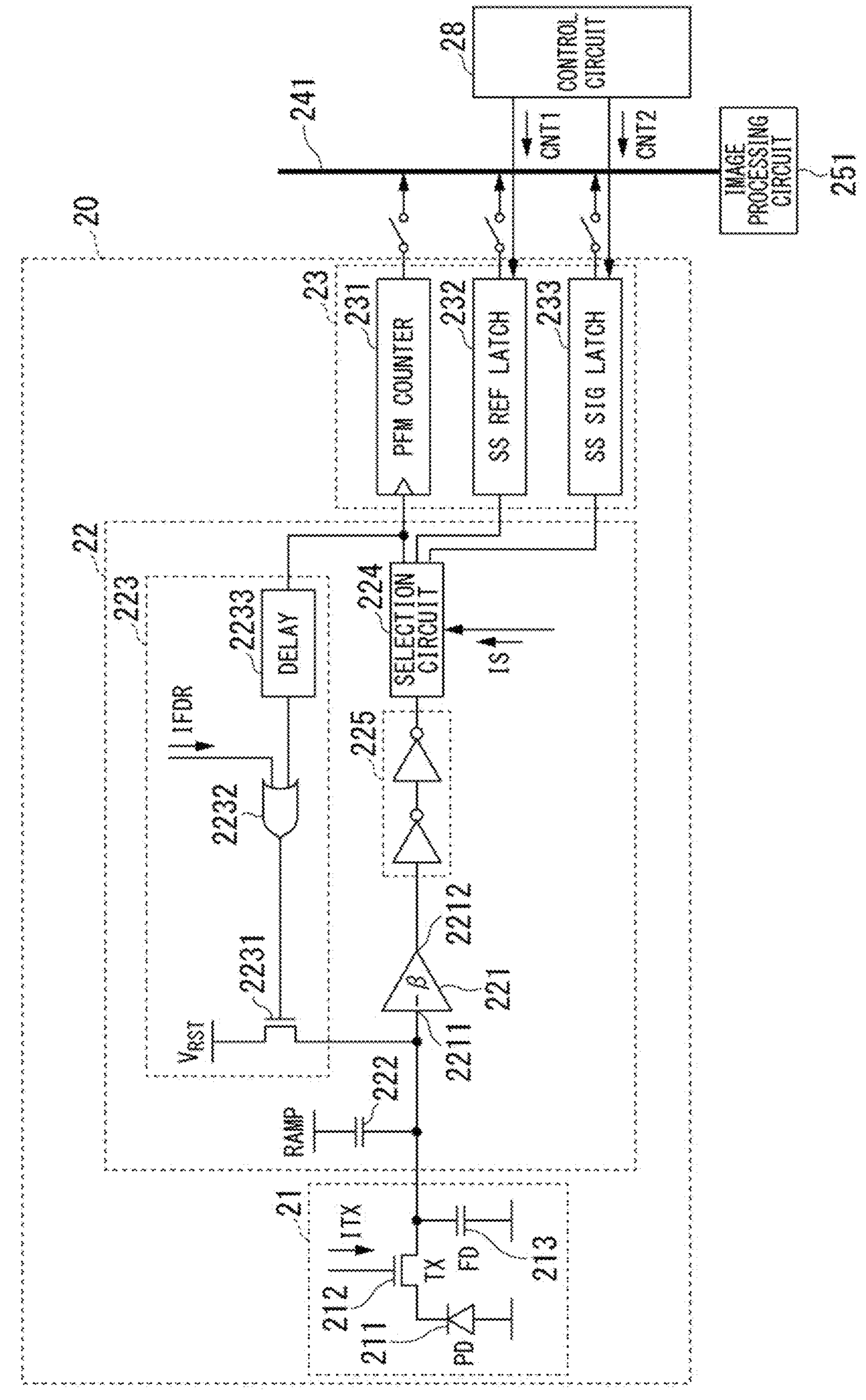
FIG. 3 is a diagram showing an example of a functional configuration of a circuit for each pixel included in the imaging element according to the embodiment of the present invention.

FIG. 3 is a diagram showing an example of a functional configuration of the circuit 20 for each pixel included in the imaging element 1 according to the embodiment of the present invention. The configuration of each function provided in the circuit 20 for each pixel and circuit blocks connected thereto will be described with reference to the drawing. The pixel 21 includes a photodiode 211, a transfer transistor 212, and a floating diffusion 213.

The photodiode 211 generates charges according to the amount of incident light (subject light). Among the charges generated by the photodiode 211, the charges equal to or less than the number of saturation electrons of the photodiode 211 are accumulated in the photodiode, and then transferred to the floating diffusion 213 via the transfer transistor 212 at a predetermined timing during an SS mode readout period. Further, among the generated charges, the charges exceeding the number of saturation electrons of the photodiode 211 are directly transferred (overflow-transferred) to the floating diffusion during an accumulation period without going through the transfer transistor 212 due to the photodiode 211 overflowing.

The transfer transistor 212 is controlled by the control circuit 28 via the driver 27. Specifically, the transfer transistor 212 transfers the charges accumulated in the photodiode 211 to the floating diffusion 213 based on a transfer signal ITX controlled by the control circuit 28.

The floating diffusion 213 is generated by the photodiode 211 and stores the charges transferred via the transfer transistor 212 during the readout period or the charges overflow-transferred from the photodiode 211 during the accumulation period. The floating diffusion 213 outputs a voltage corresponding to the amount of stored charge to the ADC 22.

The ADC 22 includes a comparator 221, a capacitor 222, a reset circuit 223, and a selection circuit 224.

The comparator 221 includes an input terminal 2211 and an output terminal 2212. When an input voltage applied to the input terminal 2211 is equal to or more than a predetermined voltage (an inversion threshold voltage) (that is, when the amount of charges accumulated in the floating diffusion 213 is equal to or more than a predetermined amount), the comparator 221 inverts a level of a voltage output to the output terminal 2212. The voltage output by the comparator 221 is input to the selection circuit 224.

The comparator 221 is configured of an amplifier with a large gain. When a voltage amplification factor of the comparator 221 is small, an amplification circuit 225 may be provided to amplify the voltage output by the comparator 221. In the case of a configuration including the amplification circuit 225, the amplification circuit 225 outputs the voltage obtained as a result of amplification to the selection circuit 224.

In this embodiment, the number of saturation electrons of the photodiode 211 may be configured to be smaller than circuit saturation of the comparator 221.

Figure 4:
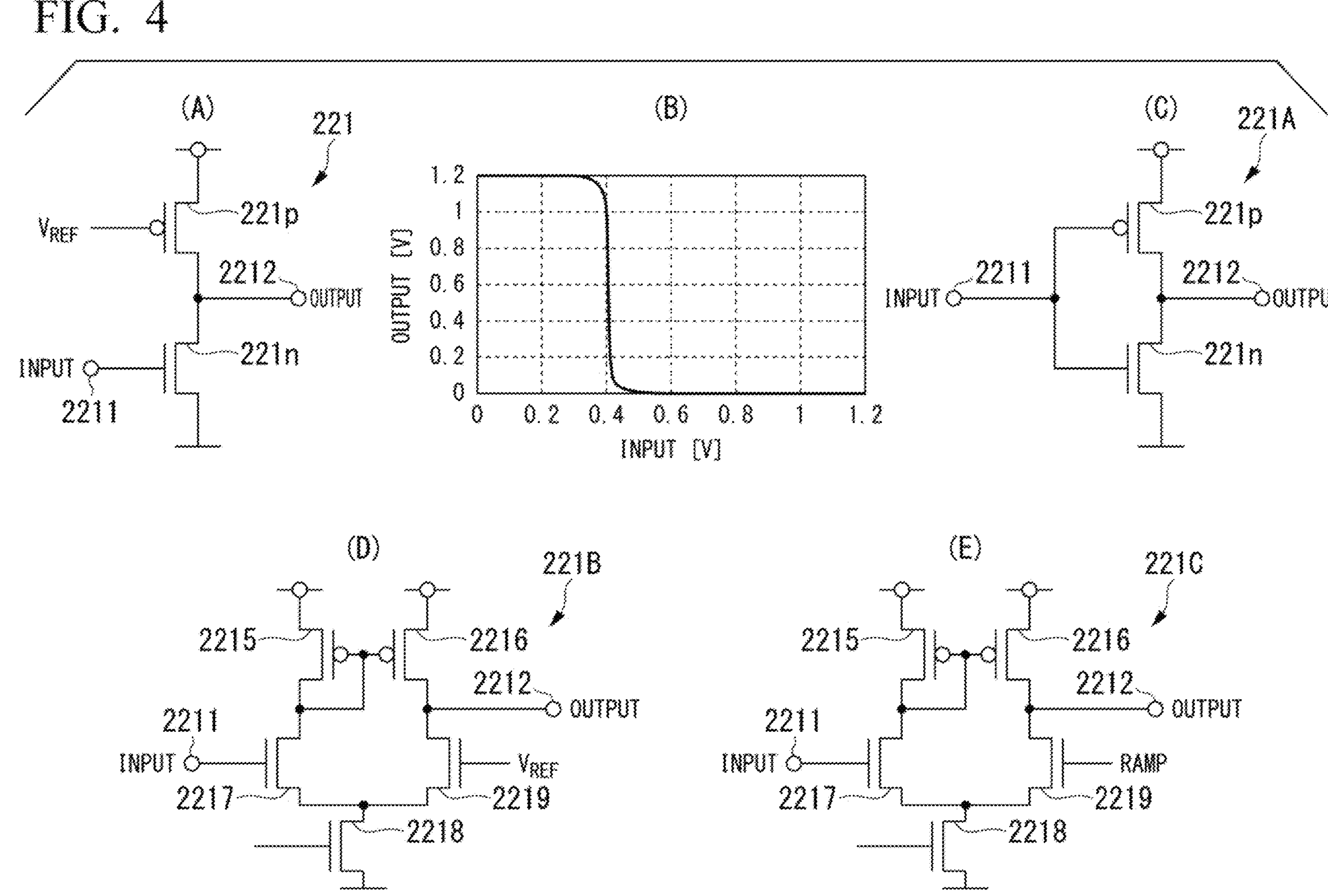
FIG. 4 is a diagram showing an example of a circuit configuration of a comparator according to the embodiment of the present invention.

Here, the comparator 221 may be configured using a source-grounded circuit of which the source side is grounded. An example of a circuit configuration when the comparator 221 is a source-grounded circuit will be described with reference to FIG. 4.

FIG. 4(A) is a diagram showing an example of a circuit configuration of the comparator 221 according to the embodiment of the present invention. As shown in the drawing, the comparator 221 includes a p-channel FET (a second transistor) 221*p* and an n-channel FET (a first transistor) 221*n*.

An input terminal (a first input terminal) 2211 of the comparator 221 is connected to a gate of the n-channel FET 221*n*. An output terminal 2212 of the comparator 221 is connected to a connection point between a drain of the p-channel FET 221*p* and a drain of the n-channel FET 221*n*. A source of the n-channel FET 221*n* is grounded, and a source of the p-channel FET 221*p* is connected to a power supply. A predetermined reference voltage $V_{REF}$ is applied to a gate (a second input terminal) of the p-channel FET 221*p*.

The output terminal 2212 outputs a voltage on the basis of the voltage at the first input terminal and the voltage at the second input terminal.

As a modified example of the comparator 221, the input terminal 2211 may be connected to the gate of the p-channel FET 221*p*, and the predetermined reference voltage $V_{REF}$ may be applied to the gate of the n-channel FET 221*n*.

FIG. 4(B) is a diagram showing a relationship between an input voltage input to the input terminal 2211 of the comparator 221 and an output voltage output from the output terminal 2212. In the example shown in the drawing, a voltage at which the inversion threshold of the comparator 221 is 0.4 V is applied to the predetermined reference voltage $V_{REF}$.

When the input voltage is 0.4 V or less, the output voltage outputs 1.2 V which is a power supply voltage. When the input voltage is 0.4 V or more, the output voltage is 0V.

As a modified example of the comparator 221, FIG. 4(C) shows an example of a comparator 221A, and FIG. 4(D) shows an example of a comparator 221B. The comparator 221A and the comparator 221B are both modified examples of the comparator 221.

The comparator 221A shown in FIG. 4(C) is configured of an inverter. Similar to the comparator 221, the comparator 221A includes a p-channel FET 221*p* and an n-channel FET 221*n*. The comparator 221A differs from the comparator 221 in that the gate of the p-channel FET 221*p* and the gate of the n-channel FET 221*n* are connected to each other and then connected to the input terminal 2211. The comparator 221A can be operated without using the reference voltage $V_{REF}$ by configuring the gate of the p-channel FET 221*p* and the gate of the n-channel FET 221*n* to be connected to each other.

The comparator 221B shown in FIG. 4(D) is configured of a differential pair. The comparator 221B includes a transistor 2215, a transistor 2216, a transistor 2217, a transistor 2218, and a transistor 2219.

The transistor 2215 and the transistor 2216 constitute a current mirror circuit. A current flowing between a source and a drain of the transistor 2215 is copied as a current flowing between a source and a drain of the transistor 2216. A current copied between the source and the drain of the transistor 2216 and a voltage according to the reference voltage $V_{REF}$ are output to the output terminal 2212.

The control circuit 28 may be configured to turn off a function of the comparator 221B and to cut off a current flowing in the comparator 221B by controlling a conduction state between a source and a drain of the transistor 2218.

A comparator 221C shown in FIG. 4(E) is configured of a differential pair similarly to the comparator 221B. In the description of the comparator 221C, the same components as those in the comparator 221B are given the same reference numerals, and descriptions thereof will be omitted. The comparator 221C differs from the comparator 221B in that a RAMP signal is input to a gate of the transistor 2219.

Figure 5:
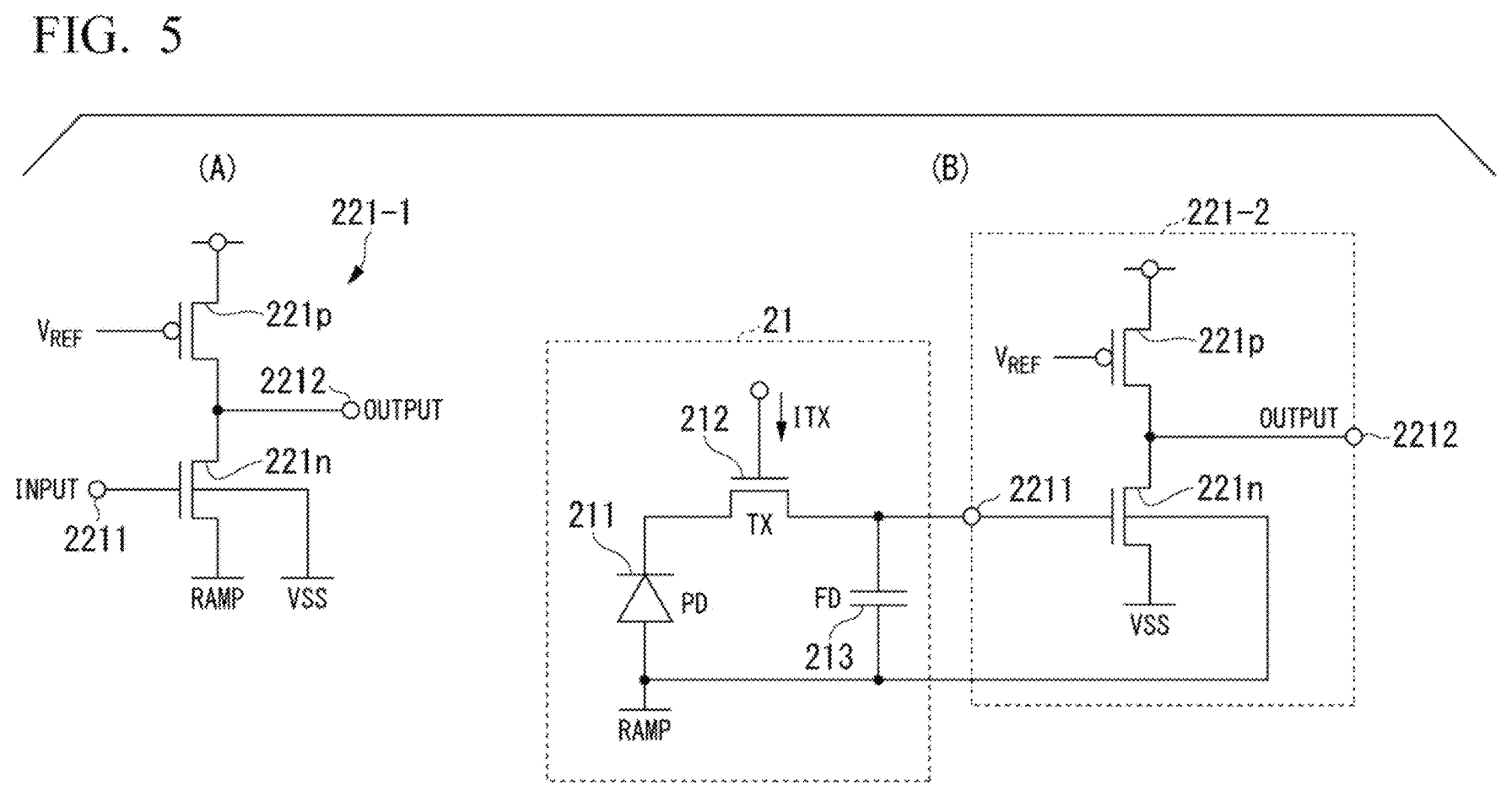

The comparator 221 described with reference to FIG. 4(A) may be configured using the RAMP signal. An example of the circuit configuration of the comparator 221 will be described with reference to FIG. 5. In the description of FIG. 5, the same components as those in the comparator 221 are given the same reference numerals, and descriptions thereof will be omitted.

A comparator 221-1 shown in FIG. 5(A) is a modified example of the comparator 221. The comparator 221-1 differs from the comparator 221 in that the RAMP signal is input to the source of the n-channel FET 221*n*. With such a configuration, the capacitance of the floating diffusion 213 is reduced, and noise can be curbed more than in the comparator 221.

A comparator 221-2 shown in FIG. 5(B) is a modified example of the comparator 221. The comparator 221-2 differs from the comparator 221 in that the source of the n-channel FET 221*n* is grounded. In this case, the RAMP signal is input to an anode of the photodiode 211. With such a configuration, the capacitance of the floating diffusion 213 is reduced, and noise can be curbed more than in the comparator 221.

In this embodiment, the comparator 221 may be replaced with one of the comparator 221A, the comparator 221B, the comparator 221C, the comparator 221-1, and the comparator 221-2.

Returning to FIG. 3, the selection circuit 224 outputs an output result of the comparator 221 to the memory (a measurement part) 23. The memory 23 includes a PFM counter 231, an SS REF latch 232, and an SS SIG latch 233.

The PFM counter 231 counts the number of times the amount of charges accumulated in the floating diffusion 213 is equal to or more than a predetermined amount during the accumulation period in a PFM mode.

The SS REF latch 232 receives a count value CNT1 generated by the control circuit 28 and updated at a predetermined period and latches the count value input at that time using an output of the selection circuit 224 as a trigger. The SS SIG latch 233 receives a count value CNT2 generated by the control circuit 28 and updated at a predetermined period and latches the count value input at that time using the output of the selection circuit 224 as a trigger. The SS REF latch 232 and the SS SIG latch 233 measure the amount of charges accumulated in the photodiode 211 or the floating diffusion 213.

The selection circuit 224 selects to which of the PFM counter 231, the SS REF latch 232, or the SS SIG latch 233 included in the memory 23 the output of the comparator 221 is output. Specifically, the selection circuit 224 selects to which memory included in the memory 23 the output of the comparator 221 is output based on a selection signal IS. The selection signal IS is controlled by the control circuit 28.

The value output to the memory 23 is read out to the image processing circuit 251 by the control circuit 28 via a data bus 241 that is a part of the readout circuit 24.

The capacitor 222 capacitively couples the input of comparator 221 and the RAMP signal. The RAMP signal is an analog voltage value controlled by the control circuit 28. As a voltage of the RAMP signal increases, the input voltage of the comparator 221 increases.

The reset circuit 223 includes a reset transistor 2231. The reset transistor 2231 resets the input voltage of the comparator 221, that is, the floating diffusion 213 by supplying a reset voltage $V_{RST}$ to the floating diffusion 213. The reset transistor 2231 is controlled by an FD reset signal IFDR controlled by the control circuit 28 or an output of the selection circuit 224.

The reset circuit 223 may be configured to include a logic gate 2232 so as to be controlled by at least one of the FD reset signal IFDR and the output from the selection circuit 224.

A delay circuit 2233 may be provided between the output of the selection circuit 224 and the logic gate 2232.

Figure 6:
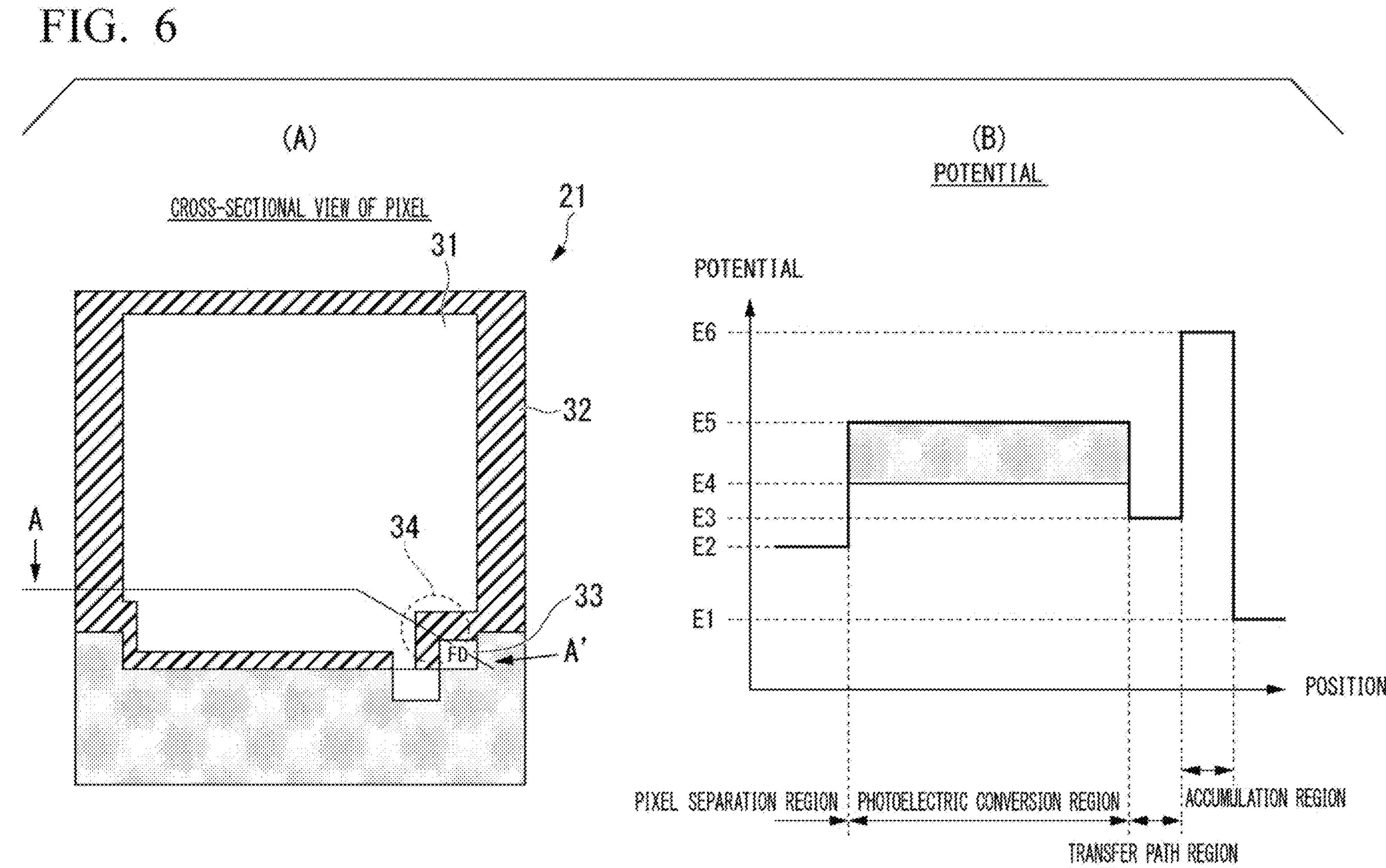
FIG. 6 is a diagram showing a pixel according to the embodiment of the present invention.

FIG. 6 is a diagram showing the pixel 21 according to the embodiment of the present invention. An example of a configuration of the pixel 21 will be described with reference to FIG. 6(A), and an example of an operation of each part will be described with reference to FIG. 6(B).

FIG. 6(A) is an example of a cross-sectional view of the pixel 21. The pixel 21 includes a photoelectric conversion region (a photoelectric conversion part) 31 which is an n-type region, a pixel separation region 32 which is a p-type region, an accumulation region (an accumulation part) 33 which is an n-type region, and an overflow transfer path region (an overflow transfer path part) 34 which is a p-type region.

The photoelectric conversion region 31 constitutes the photodiode 211 in FIG. 3. That is, the photoelectric conversion region 31 converts light into charges and accumulates the charges. In the following embodiments, the charges accumulated in the photoelectric conversion region 31 will be described as electrons generated by photoelectric conversion. Further, electrostatic potential and potential barrier will also be described as electrostatic potential and potential barrier for electrons. However, this embodiment is not limited to this example. The charges accumulated in the photoelectric conversion region 31 may be a hole of which the polarity is opposite to that of electrons.

The accumulation region 33 constitutes the floating diffusion 213 in FIG. 3. That is, charges accumulated in the photoelectric conversion region 31 or charges overflowing from the photoelectric conversion region 31 are accumulated in the accumulation region 33.

The pixel separation region 32 is a region for separating each of the photoelectric conversion regions 31 between the pixels 21 adjacent to each other.

The overflow transfer path region 34 is a region serving as a transfer path for transferring charges, which is generated by the photoelectric conversion region 31 and exceeds a predetermined amount, from the photoelectric conversion region 31 to the accumulation region 33. The overflow transfer path region 34 has a lower potential than the pixel separation region 32 formed around the photoelectric conversion region 31. The overflow transfer path region 34 is configured to have a lower potential barrier by lowering impurity concentration compared to the pixel separation region 32.

FIG. 6(B) is a diagram showing the potential in an A-A' cross section of the pixel 21 shown in FIG. 6(A). Movement of charges in the pixel 21 will be described with reference to FIG. 6(B).

In the example shown in the drawing, the potential of the pixel separation region 32 is a potential E2. The potential of the overflow transfer path region 34 is a potential E3 which is formed lower than the potential E2 of the pixel separation region 32. The potential of the photoelectric conversion region 31 is a potential E5 which is set to be lower than the potential E2 of the pixel separation region 32 and the potential E3 of the overflow transfer path region 34. Charges generated by the photoelectric conversion region 31 are accumulated in the photoelectric conversion region 31. In the example shown in the drawing, charges are accumulated up to a potential E4.

Here, when the charges generated by the photoelectric conversion region 31 and accumulated in the photoelectric conversion region 31 exceed the potential barrier of the overflow transfer path region 34 (hereinafter, also referred to as overflow), the charges are overflow-transferred to the accumulation region 33 via the overflow transfer path region 34. That is, in this embodiment, the overflow transfer path region 34 is formed by lowering the potential barrier of the overflow transfer path region 34 compared to the potential barrier of the pixel separation region 32, so that charges easily flow into the accumulation region 33 when the photoelectric conversion region 31 is saturated with charges.

Figure 7:
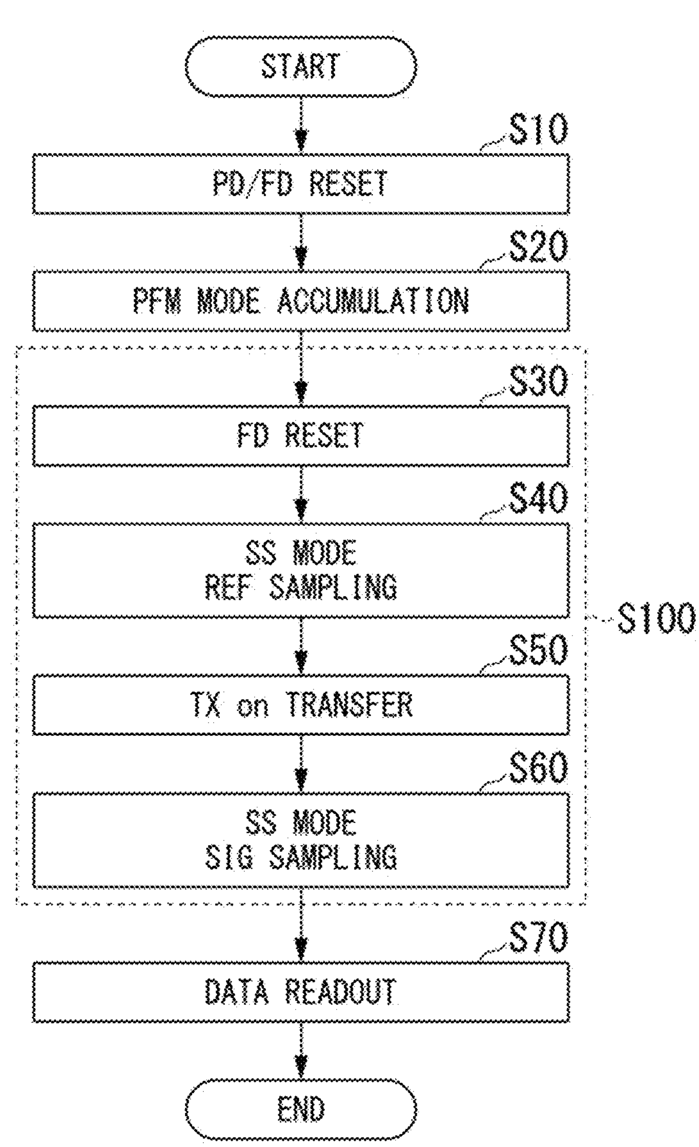
FIG. 7 is a diagram showing an example of a series of operations of the imaging element according to the embodiment of the present invention.

FIG. 7 is a diagram showing an example of a series of operations of the imaging element 1 according to the embodiment of the present invention. The example of a series of operations of the imaging element 1 will be described with reference to the drawing.

(Step S10) The control circuit 28 provided in the imaging element 1 resets the photodiode 211 and the floating diffusion 213 provided in each of the pixels 21 in preparation for charge accumulation. Specifically, the control circuit 28 simultaneously resets the photodiode 211 and the floating diffusion 213 provided in each of the pixels 21 in all the pixels 21 by controlling the FD reset signal IFDR and the transfer signal ITX.

(Step S20) The imaging element 1 performs A/D conversion of the accumulated charges in a PFM mode. Specifically, the control circuit 28 sets the selection circuit 224 to the PFM mode using a selection signal IS, and starts accumulation of charges.

Here, in this embodiment, the imaging element 1 performs A/D conversion in two types of modes including the PFM mode and the SS mode. The PFM mode will be described with reference to FIG. 8.

PFM Mode

Figure 8:
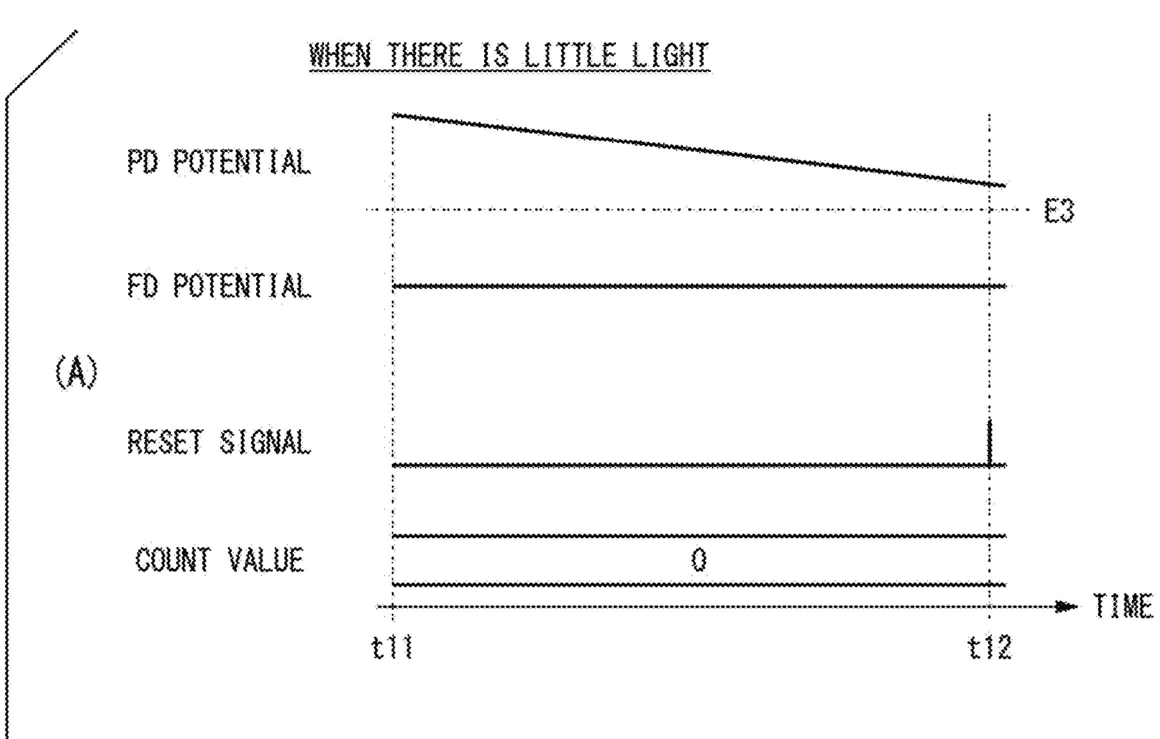
FIG. 8 is a diagram showing an example of an operation in a PFM mode according to the embodiment of the present invention.
Figure 8:
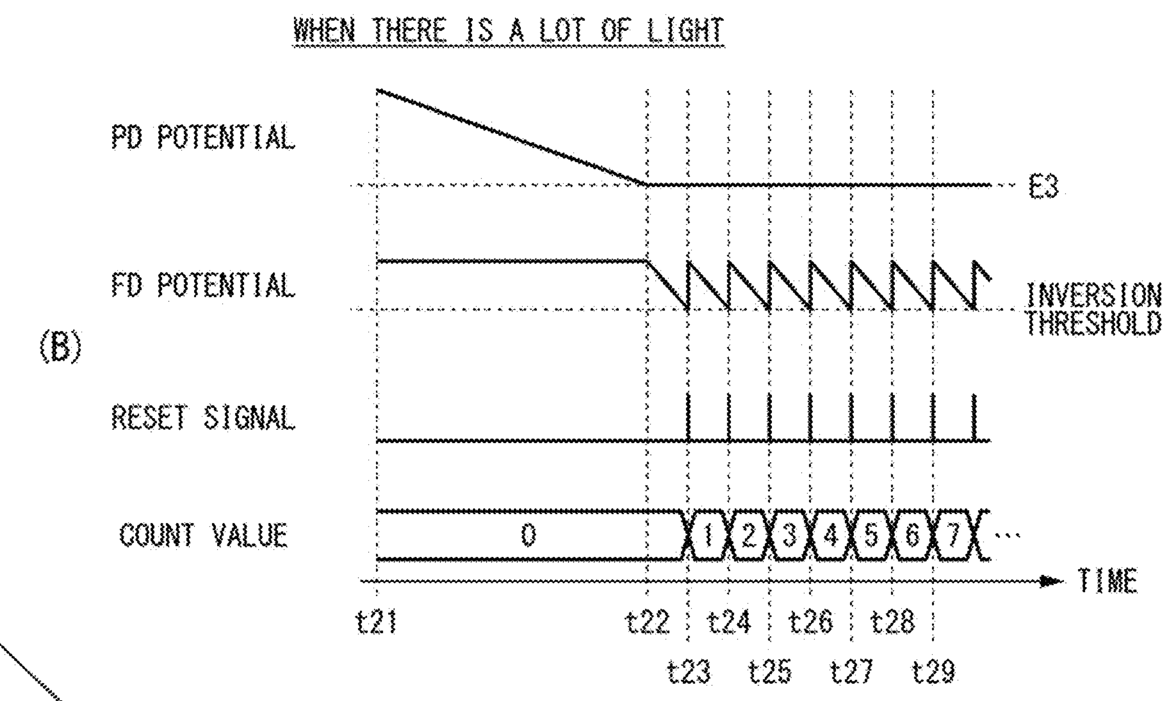

FIG. 8 is a diagram showing an example of an operation in the PFM mode according to the embodiment of the present invention. The PFM mode will be described with reference to the drawing. In this example, an operation in each of a case in which the amount of light incident on the imaging element 1 is small and a case in which the amount of light is large will be described.

In the drawing, the potential of the photodiode 211 is referred to as a "PD potential," the potential of the floating diffusion 213 (here, equivalent to a voltage) is referred to as an "FD potential," the gate voltage of the reset transistor 2231 is referred to as a "reset signal," and the count value of the PFM counter 231 is referred to as a "count value," and their respective changes over time are shown. Vertical axes of the PD potential, the FD potential, and the reset signal are potentials, and the count value indicates the value of the counter.

FIG. 8(A) is a diagram showing an example of an operation when the amount of light incident on the imaging element 1 is small.

When light begins to be incident on the photodiode 211 at time t11, charges are generated, and thus the PD potential begins to decrease. In the example shown in FIG. 8(A), the PD potential decreases slowly because of the example of the case in which the amount of light incident on the photodiode 211 is small.

When the incidence on the photodiode 211 ends at time t12, the decrease in the PD potential also ends. In this example, since the PD potential decreases slowly, the PD potential does not reach a potential at which the potential E4 exceeds the potential E3 of the overflow transfer path region 34 (overflow does not occur). Thus, charges are accumulated only within the photodiode 211. In this case, no reset occurs, and the count value of the PFM counter 231 remains zero.

FIG. 8(B) is a diagram showing an example of an operation when the amount of light incident on the imaging element 1 is large.

When light begins to be incident on the photodiode 211 at time t21, charges are generated, and thus the PD potential begins to decrease. In the example shown in FIG. 8(B), the PD potential suddenly decreases because of the example of the case in which the amount of light incident on the photodiode 211 is large. At time t22, when the PD potential reaches a potential at which the potential E4 exceeds the potential E3 of the overflow transfer path region 34 and the photodiode 211 is saturated, the charges generated by the photodiode 211 are overflow-transferred to the floating diffusion 213 via the overflow transfer path region 34. That is, the FD potential begins to decrease after time t22.

At time t23, when the FD potential reaches a predetermined inversion threshold voltage of the comparator 221, the count value of the PFM counter 231 is counted up, and a reset signal is generated. When the reset transistor 2231 is turned on by generating the reset signal, the potential of the floating diffusion 213 is reset.

At time t23, even after the count value of the PFM counter 231 is counted up and the potential of the floating diffusion 213 is reset, light continues to be incident on the photodiode 211, and thus the FD potential begins to decrease again. In the example shown in FIG. 8(B), the floating diffusion 213 is reset and the PFM counter 231 is counted up repeatedly from time t23 to time t29. That is, the PFM counter 231 measures the number of times a predetermined amount of charges is accumulated in the floating diffusion 213 and the floating diffusion 213 is reset. In this way, in the PFM mode, the amount of charges overflowing from the photodiode 211 and accumulated in the floating diffusion 213 is measured.

In this embodiment, in order to increase system saturation, the count value of the PFM counter 231 may be configured to be repeatedly reset at a predetermined period after readout to the image processing circuit 251 during the PFM mode operation. The PFM counter 231 becomes less likely to be saturated by reading out and resetting the count value of the PFM counter 231 at a predetermined period, and system saturation can be increased.

When the incidence of the light on the photodiode 211 ends, the control circuit 28 detects the charges remaining in the photodiode 211 without overflowing.

Returning to FIG. 7, Step S100 is an operation for detecting the charges remaining in the photodiode 211. In this embodiment, the control circuit 28 detects the charges within the photodiode 211 in the SS mode. A flow of the operation in the SS mode for detecting the charges remaining in the photodiode 211 will be described with reference to Steps S30 to S60.

SS Mode (Step S30) The control circuit 28 turns on the reset transistors 2231 in all the pixels 21 and resets the floating diffusion 213 by controlling the FD reset signal IFDR.

(Step S40) In this embodiment, correlated double sampling (hereinafter, referred to as CDS) is performed in order to remove an output variation for each of the pixels 21 and an output fluctuation in a time axis direction. In Step S40, measurement of the voltage of the floating diffusion 213 immediately after reset (DARK sampling or REF sampling) is performed.

(Step S50) The control circuit 28 turns on the transfer transistor 212 by outputting the transfer signal ITX to the transfer transistor 212. When the transfer transistor 212 is turned on, the charges generated by the photodiode 211 in Step S20 and remaining in the photodiode 211 without being overflow-transferred to the accumulation region 33 is transferred to the floating diffusion 213.

(Step S60) The control circuit 28 performs measurement (SIG sampling) of a voltage in a state in which the charges are transferred to the floating diffusion 213.

(Step S70) The control circuit 28 reads out the count value of the PFM counter 231 and the values of the SS REF latch 232 and the SS SIG latch 233 to the image processing circuit 251.

The control circuit 28 reads out the values of the SS REF latch 232 and the SS SIG latch 233 as the amount of charges remaining in the photodiode 211, and reads out the count value of the PFM counter 231 to the image processing circuit 251 as the amount of charges that overflows from the photodiode 211 and is accumulated in the floating diffusion 213 during the accumulation period in the PFM mode. The image processing circuit 251 or a calculation part (not shown) provided outside the element calculates the amount of charges generated by the photodiode 211 from the amount of charges obtained by adding the amount of charges remaining in the photodiode 211 and the amount of charges overflowing from the photodiode 211 and accumulated in the floating diffusion 213. When the amount of charges remaining in the photodiode 211 is sufficiently small and it can be determined that the photodiode 211 has not overflowed, addition is not performed and the amount of charges remaining in the photodiode 211 is directly calculated as a total signal.

Figure 9:
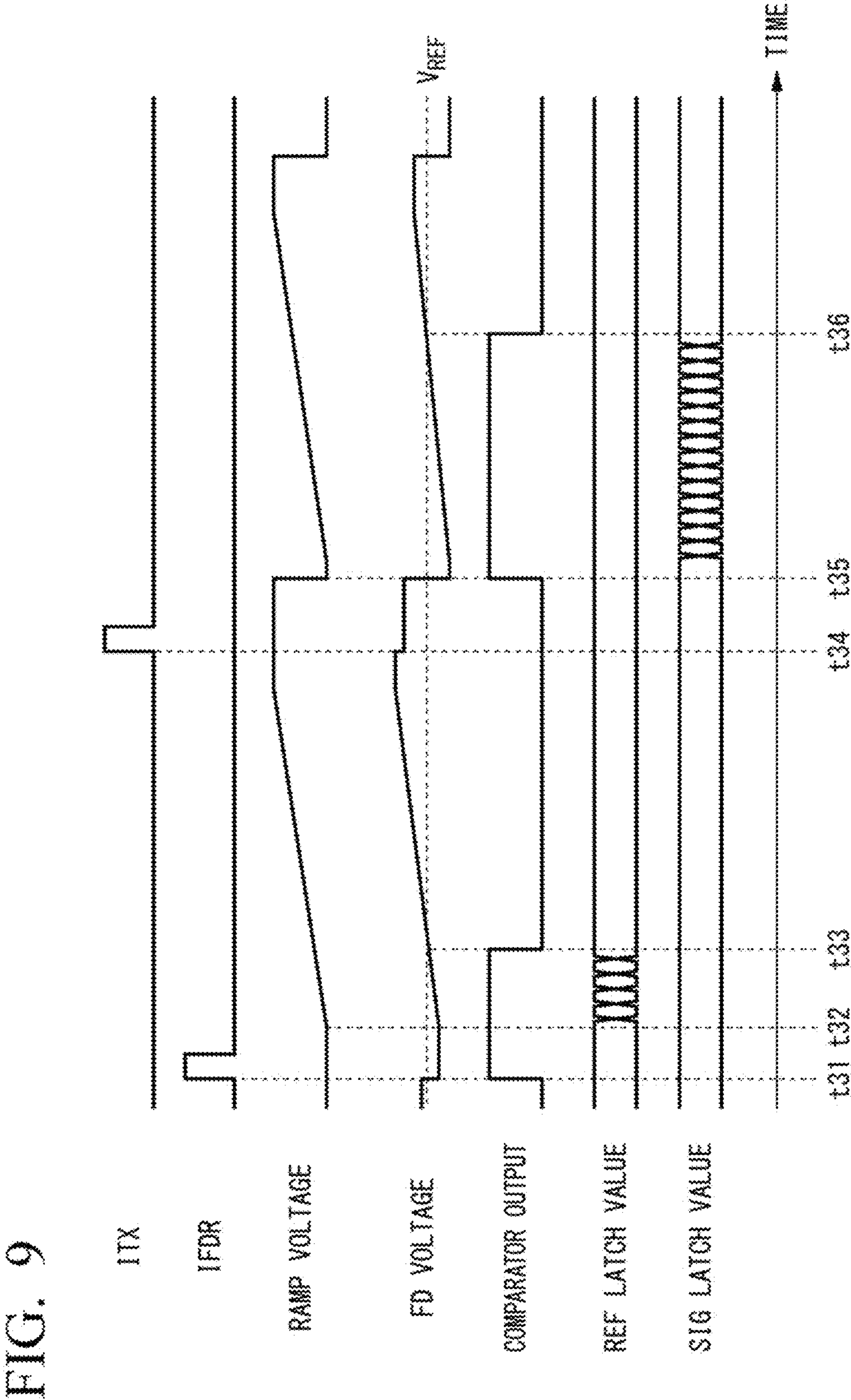
FIG. 9 is a diagram showing an example of an operation in an SS mode according to the embodiment of the present invention.

FIG. 9 is a diagram showing an example of an operation in the SS mode according to the embodiment of the present invention. With reference to the drawing, a flow of processing for detecting the charges remaining in the photodiode 211 in the SS mode will be described.

In the drawing, the transfer signal ITX is referred to as "ITX," the FD reset signal IFDR is referred to as "IFDR," the RAMP voltage applied to the capacitor 222 is referred to as a "RAMP voltage," the voltage of floating diffusion 213 is referred to as an "FD voltage," the output voltage of the comparator 221 is referred to as a "comparator output," the value of the SS REF latch 232 is referred to as a "REF latch value," and the value of the SS SIG latch 233 is referred to as a "SIG latch value," and their respective changes over time are shown. Vertical axes of ITX, IFDR, RAMP voltage, FD voltage, and comparator output are voltages, and the REF latch value and SIG latch value indicate digital values.

At time t31, the control circuit 28 outputs the FD reset signal IFDR. When the FD reset signal IFDR is output and the reset transistor 2231 is turned on, the FD voltage is reset. H is output to the output terminal of the comparator 221 by resetting the FD voltage.

At time t32, the control circuit 28 slowly increases the RAMP potential. At time t32, while the RAMP potential is increased, the control circuit 28 changes the digital value input to the SS REF latch 232 at a predetermined period.

When the FD voltage reaches the predetermined inversion threshold voltage set in the comparator 221 at time t33, the SS REF latch 232 holds the digital value input from the control circuit 28 at that time, and the REF latch value is determined. The REF latch value determined at time t33 is a value corresponding to the voltage of the floating diffusion 213 at the time of reset in the DARK sampling (or the REF sampling).

At time t34, the control circuit 28 outputs the transfer signal ITX. When the transfer signal ITX is output and the transfer transistor 212 is turned on, the charges stored in the photodiode 211 are transferred to the floating diffusion 213.

At time t35, the control circuit 28 slowly increases the RAMP voltage. At time t35, while the RAMP voltage is increased, the control circuit 28 changes the digital value input to the SS SIG latch 233 at a predetermined period.

When the FD voltage reaches the predetermined inversion threshold voltage set in the comparator 221 at time t36, the SS REF latch 232 holds the digital value input from the control circuit 28 at that time, and the SIG latch value is determined. The SIG latch value determined at time t36 is a value corresponding to the voltage of the floating diffusion 213 in the SIG sampling. That is, it is a value determined by both the voltage immediately after the floating diffusion 213 is reset and the amount of charges transferred from the photodiode 211 under the control of the transfer signal ITX.

The charges remaining in the photodiode 211 without overflowing is calculated by the image processing circuit 251 or the calculation part (not shown) provided outside the element on the basis of a value obtained by subtracting the voltage value shown by the REF latch from the voltage value shown by the SIG latch.

In the SS mode, the SS REF latch 232 and the SS SIG latch 233 store the digital value input from the control circuit 28 at the time when the potential of the output terminal 2212 of the comparator 221 is switched. The control circuit 28 changes the voltage at the input terminal 2211 of the comparator 221 by increasing the RAMP voltage. The control circuit 28 measures the amount of charges remaining in the photodiode 211 on the basis of a time until the voltage at the output terminal 2212 of the comparator 221 is inverted.

FIG. 10 is a diagram showing a relationship between a number of signal electrons and an output value according to the embodiment of the present invention. The relationship between the number of signal electrons and the output value in this embodiment will be described with reference to the drawing. The number of signal electrons is the number of electrons of the charges generated by the photodiode 211.

When the number of signal electrons is from 0 to N1, the output value in the SS mode becomes an output value. For example, when the number of signal electrons is N1, the output is O1.

When the number of signal electrons is N1 or more, the output value is the sum of the output value in the SS mode and the output value in the PFM mode. For example, when the number of signal electrons is N2, the output in the SS mode is O1 and the output in the PFM mode is O2, and thus O3 which is the sum of O1 and O2 becomes a combined output.

The number of signal electrons N1 is a value corresponding to the overflow threshold of the photodiode 211, that is, the number of saturation electrons of the photodiode 211.

Summary of Effects of First Embodiment

As described above, according to this embodiment, the imaging element 1 includes the overflow transfer path region 34 which is a transfer path for transferring charges from the photodiode 211 to the floating diffusion 213 and is a region having a lower potential than in the pixel separation region formed around the photodiode 211. The imaging element 1 includes the overflow transfer path region 34 to overflow-transfer charges to the floating diffusion 213 when the photodiode 211 is saturated. The circuit 20 for each pixel measures the amount of overflowed charges generated by the photodiode 211 by measuring the number of times a predetermined amount of charges is accumulated in the floating diffusion 213 during the PFM mode period. In addition, the amount of charges generated by the photodiode 211 and not overflowing is measured by transferring the charges remaining in the photodiode 211 to the floating diffusion 213 during the SS mode period and measuring the voltage of the floating diffusion 213. By using both, the amount of charges generated by the photodiode 211 is measured.

Here, in a conventional measurement method using the PFM method, while it is possible to increase the number of system saturation electrons, when the amount of light incident on the photodiode is small (that is, when the number of signal electrons is small), the problem was that noise was large (the S/N ratio was low). In the conventional PFM method, since it is necessary to constantly measure the voltage of the photodiode with a comparator, it is not possible to use a buried photodiode with a small dark current, resulting in large dark current shot noise. Further, in the conventional PFM method, signal charges of one count or less could not be detected, and quantization noise was also generated. Compared to the SS method, the PFM method requires a much larger amount of charges per count, and has much larger quantization noise.

In this embodiment, a high S/N ratio can be obtained by combining the PFM method and the SS method, even when the number of signal electrons is small. That is, readout noise can be curbed even when the number of system saturation electrons is large.

FIG. 11 is a diagram showing a relationship between the number of signal electrons and the S/N ratio according to the embodiment of the present invention. This drawing shows the relationship between the number of signal electrons and the S/N ratio for each measurement method using the SS method, the PFM method, and a hybrid method that combines the SS method and the PFM method. As shown in the drawing, it is possible to obtain a high S/N ratio and also to obtain the number of high saturation electrons using the hybrid method according to this embodiment.

That is, imaging having characteristics of both the SS method and the PFM method can be performed in one shot using the hybrid method according to this embodiment.

Further, the overflow transfer path region 34 in this embodiment is formed by lowering the impurity concentration compared to in the pixel separation region 32. Therefore, according to this embodiment, the overflow transfer path region 34 can be easily formed.

Furthermore, the imaging element 1 in this embodiment measures the charges that exceed the saturation of the photodiode 211 and overflow by measuring the number of times the FD potential reaches a predetermined inversion threshold voltage in the PFM mode. Therefore, according to the imaging element 1 according to this embodiment, it is possible to acquire a signal that exceeds the saturation of the photodiode 211.

Furthermore, according to the imaging element 1 according to this embodiment, since the number of system saturation electrons is determined by the number of bits of the counter memory, the number of system saturation electrons can be increased by increasing the number of bits. That is, according to the imaging element 1 according to this embodiment, the number of system saturation electrons can be easily increased by increasing the number of bits of the counter memory.

Furthermore, the imaging element 1 in this embodiment measures the amount of charges remaining in the photodiode 211 in the SS mode. Therefore, according to the imaging element 1 according to this embodiment, conventional noise reduction techniques such as FD capacitance reduction can be applied. Furthermore, when a buried photodiode is used, the dark current can be reduced.

Furthermore, compared to the PFM method, the SS method requires a much smaller amount of charges per count, and can reduce quantization noise. Furthermore, since the correlated double sampling can be applied by reading out signals before and after complete charge transfer from the photodiode, it is possible to eliminate variations in the output between the pixels and to curb low frequency noise superimposed on a signal path.

Further, the comparator 221 in this embodiment is a source-grounded circuit of which the source side is grounded. Therefore, according to this embodiment, the number of transistors can be reduced compared to the case in which differential pairs are used. Since the number of transistors used in the comparator 221 can be reduced, the ADC 22 can be made smaller in the imaging element 1 according to this embodiment.

Further, since a through current can be easily controlled by the reference voltage $V_{REF}$, the through current when the output of the comparator 221 is inverted can be made smaller than when an inverter is used. Since the imaging element 1 according to this embodiment can reduce the through current, it is possible to curb power consumption.

Further, according to this embodiment, the image processing circuit 251 or a calculation part (not shown) provided outside the element calculates the amount of charges generated by the photodiode 211 using the amount of charges remaining in the photodiode 211 and the amount of charges overflowing from the photodiode 211 and accumulated in the floating diffusion 213. Therefore, it is possible to detect all the charges generated by the photodiode 211.

Second Embodiment

FIG. 11 is a diagram showing an example of a functional configuration of a circuit 20A for each pixel included in an imaging element 1A according to a second embodiment of the present invention. The imaging element 1A will be described with reference to the drawing. The imaging element 1A differs from the imaging element 1 in that it includes a first floating diffusion 2131 and a second floating diffusion 2132 instead of the floating diffusion 213, and a second reset transistor 2234. Components similar to those of the imaging element 1 are designated by the same reference numerals as in FIG. 3, and descriptions thereof will be omitted.

The second reset transistor 2234 is connected between the input terminal 2211 of the comparator 221 and the reset transistor 2231. In the second embodiment, the control circuit 28 includes an accumulation amount selection part. The accumulation amount selection part controls the conduction state of the second reset transistor 2234 by controlling a second FD reset signal IFDR2.

The first floating diffusion 2131 is connected between the input terminal 2211 of the comparator 221 and the transfer transistor 212. The first floating diffusion 2131 is a capacitor used in both the PFM mode and the SS mode.

The second floating diffusion 2132 is a capacitor that is connected to the input terminal 2211 of the comparator 221 when the second reset transistor 2234 is turned on. The control circuit 28 controls a second FD reset signal IFDR and turns on the second reset transistor 2234 during an operation in the PFM mode. That is, in the second embodiment, an FD capacitance is expanded by connecting the second floating diffusion 2132 in the PFM mode.

When the second reset transistor 2234 is off, the capacitance is only the first floating diffusion 2131, and the capacitance when the second reset transistor 2234 is on is the sum of the first floating diffusion 2131 and the second floating diffusion 2132. That is, the accumulation amount selection part selects the capacitance of the floating diffusion 213 from a plurality of capacitances. The accumulation amount selection part selects different capacitances when the number of times a predetermined amount of charges is accumulated in the floating diffusion 213 is measured (that is, the PFM mode), and when the amount of charges accumulated in the photodiode 211 is measured (that is, the SS mode).

Figure 13:
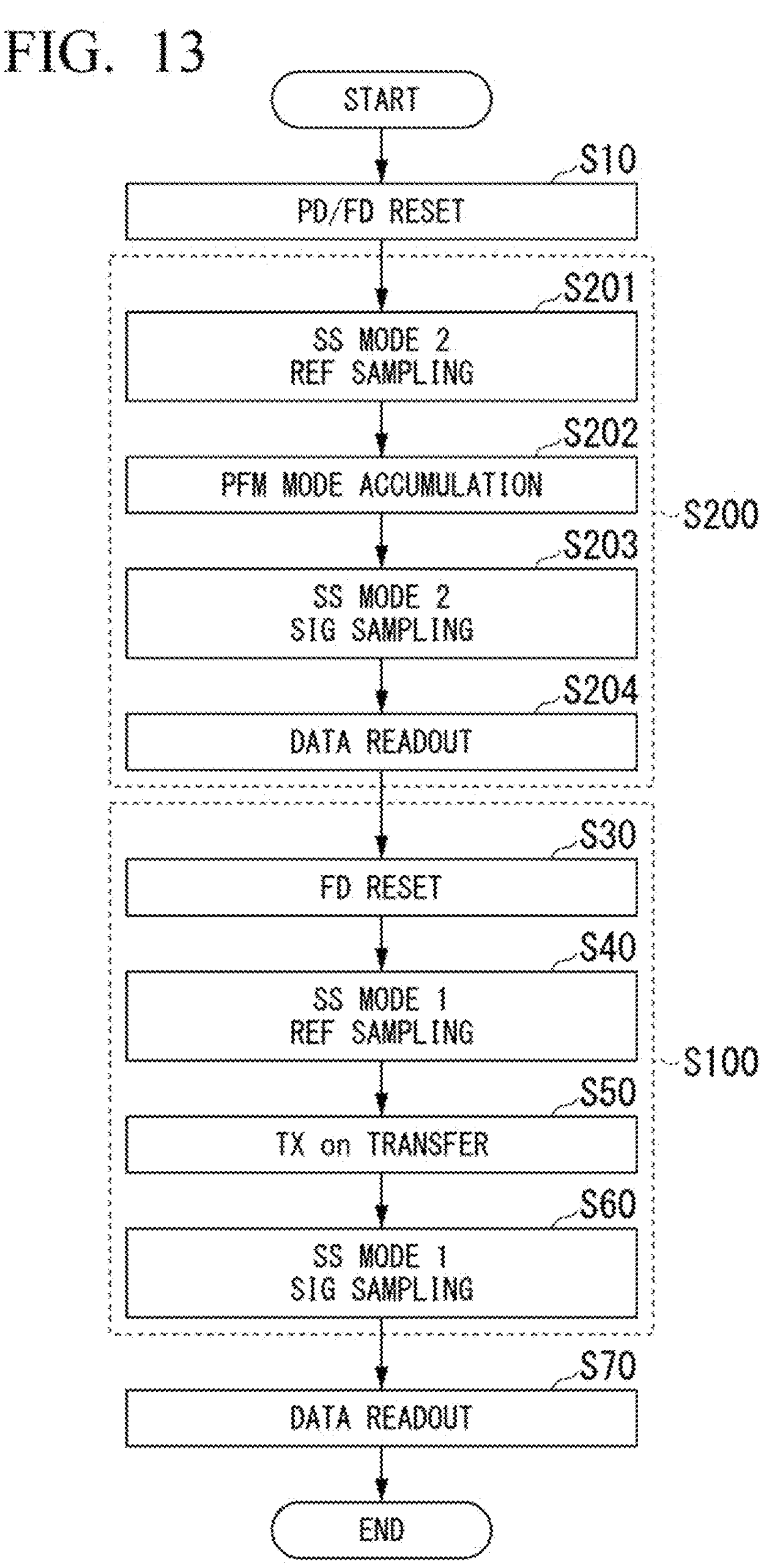
FIG. 13 is a diagram showing an example of a series of operations of the imaging element according to the second embodiment of the present invention.

FIG. 13 is a diagram showing an example of a series of operations of the imaging element 1A according to the second embodiment of the present invention. The example of a series of operations of the imaging element 1A according to the second embodiment will be described with reference to the drawing. Operations similar to those in the imaging element 1 described with reference to FIG. 7 are given the same reference numerals, and descriptions thereof will be omitted. The operation of the imaging element 1A differs from the operation of the imaging element 1 in that it includes Step S200.

The floating diffusion of the imaging element 1A according to the second embodiment includes the first floating diffusion 2131 and the second floating diffusion 2132, and thus has a larger capacitance than in the floating diffusion 213 according to the first embodiment. Therefore, in the second embodiment, the amount of charges required for the PFM counter 231 to count one is large in the PFM mode. When the amount of charges for the PFM counter 231 to count one is large, the amount of charges remaining in the floating diffusion without being counted by the PFM counter 231 will also increase, and thus a quantization error of a signal detected in the PFM mode becomes large. Therefore, in the second embodiment, the charges remaining in the floating diffusion are A/D converted in the SS mode to reduce the quantization error.

Step S200 includes an operation of A/D converting the charges remaining in the floating diffusion as one count or less in the SS mode.

Step S200 will be described with reference to FIG. 13. Step S200 includes Steps S201 to S204.

(Step S201) The control circuit 28 measures voltages of the first floating diffusion 2131 and the second floating diffusion 2132 at the time of reset. For example, the control circuit 28 slowly increases the RAMP voltage while the second reset transistor 2234 is on, and inputs a digital value that changes at a predetermined period to the SS REF latch 232. The SS REF latch 232 measures the voltage at the time of reset by holding an input digital value when the voltage at the output terminal 2212 of the comparator 221 is inverted.

(Step S202) The control circuit 28 performs A/D conversion of the charges overflowing from the photodiode 211 and accumulated in the floating diffusion in the PFM mode. At this time, the control circuit 28 maintains the second reset transistor 2234 in an ON state, and the capacitance of the floating diffusion is large.

(Step S203) The control circuit 28 performs measurement (SIG sampling) of the voltage while the charge accumulated in the floating diffusion 213 remains at the end of the PFM mode (Step S202). Then, an operation of A/D converting the charges remaining in the floating diffusion using the SS method will also be referred to as SS mode 2. In SS mode 2, the floating diffusion has a large capacitance.

(Step S204) The control circuit 28 reads out the count value of the PFM counter 231, the values of the SS REF latch 232 and the SS SIG latch 233 to the image processing circuit 251.

Hereinafter, the operation of A/D converting the charges remaining in the photodiode 211 in Step S100 using the SS method, which was described in the first embodiment, will also be referred to as SS mode 1. In SS mode 1, the capacitance of the floating diffusion is small.

In this embodiment, the control circuit 28 reads out the charges remaining in the floating diffusion 213 at the end of the PFM mode in SS mode 2, and then reads out the charges accumulated in the photodiode 211 in SS mode 1. That is, the control circuit 28 measures the number of times a predetermined amount of charges is accumulated in the floating diffusion 213 and reset, and then measures the amount of charges remaining in the floating diffusion 213 before the amount of charges remaining in the photodiode 211 is measured.

Figure 14:
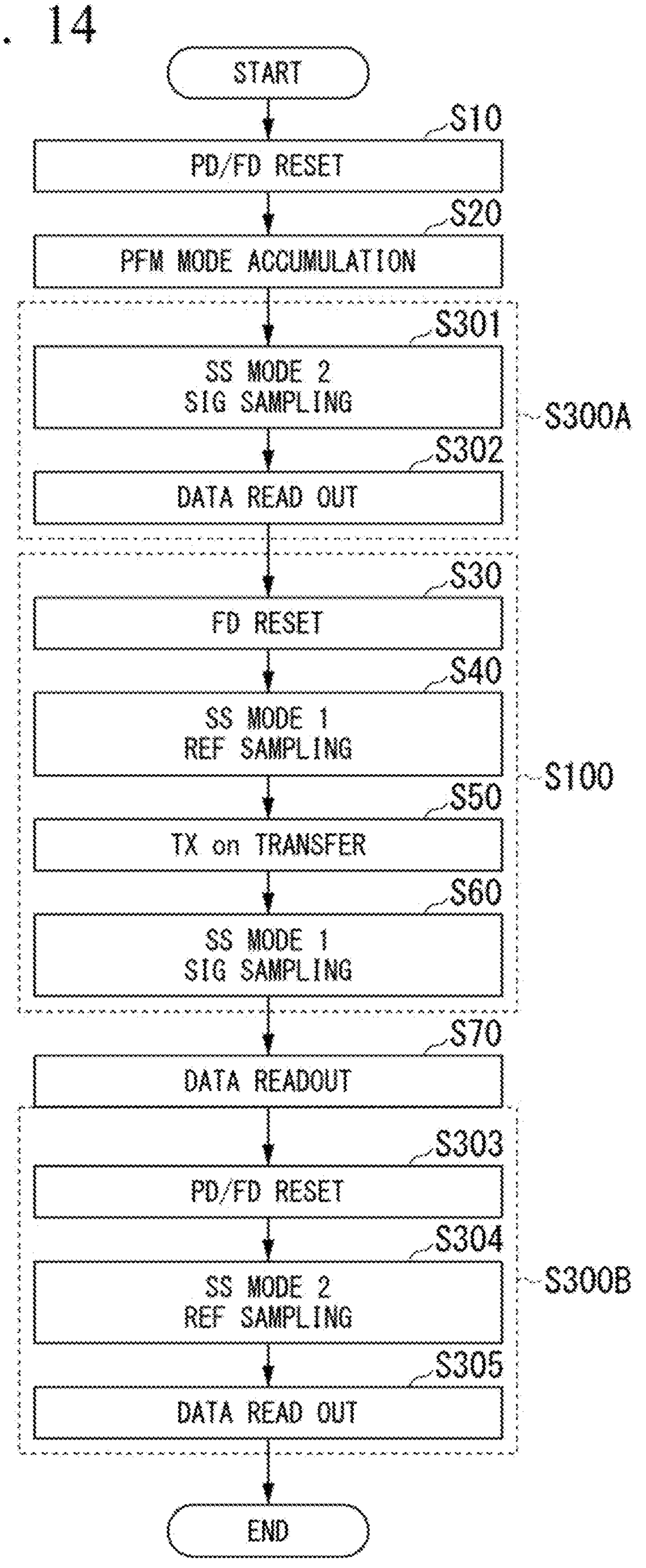
FIG. 14 is a diagram showing a modified example of a series of operations of the imaging element according to the second embodiment of the present invention.

FIG. 14 is a diagram showing a modified example of a series of operations of the imaging element 1A according to the second embodiment of the present invention. The modified example of a series of operations of the imaging element 1A according to the second embodiment will be described with reference to the drawing. The operations similar to those in the imaging element 1A described with reference to FIG. 13 are given the same reference numerals, and descriptions thereof will be omitted. The modified example of the operation of the imaging element 1A described in FIG. 14 differs from the operation of the imaging element 1A described in FIG. 13 in that it includes Step S300A and Step S300B instead of Step S200.

In the example shown in FIG. 14, in Step S300A, only the SIG sampling in SS mode 2 is performed. Step S300A includes Step S301 and Step S302.

(Step S301) The control circuit 28 performs measurement of the voltages of the first floating diffusion 2131 and the second floating diffusion 2132 in a state in which charges remain in the floating diffusion at the end of the PFM mode. At this time, the control circuit 28 turns on the second reset transistor 2234, and the capacitance of the floating diffusion is large.

(Step S302) The control circuit 28 reads out the value of the SS SIG latch 233 to the image processing circuit 251.

After Step S300A, the control circuit 28 advances the process to Step S100.

In the example shown in FIG. 14, Step S300B is performed after Step S70. In Step S300B, only the REF sampling in SS mode 2 is performed. Step S300B includes Step S303, Step S304, and Step S305.

(Step S303) The control circuit 28 resets the photodiode 211, the first floating diffusion 213, and the second floating diffusion 2132. At this time, the control circuit 28 turns on the second reset transistor 2234, and the capacitance of the floating diffusion is large.

(Step S304) The control circuit 28 performs measurement (the REF sampling) of the voltages of the first floating diffusion 213 and the second floating diffusion 2132 immediately after reset.

(Step S305) The control circuit 28 reads out the value of the SS REF latch 232 to the image processing circuit 251.

Figure 12:
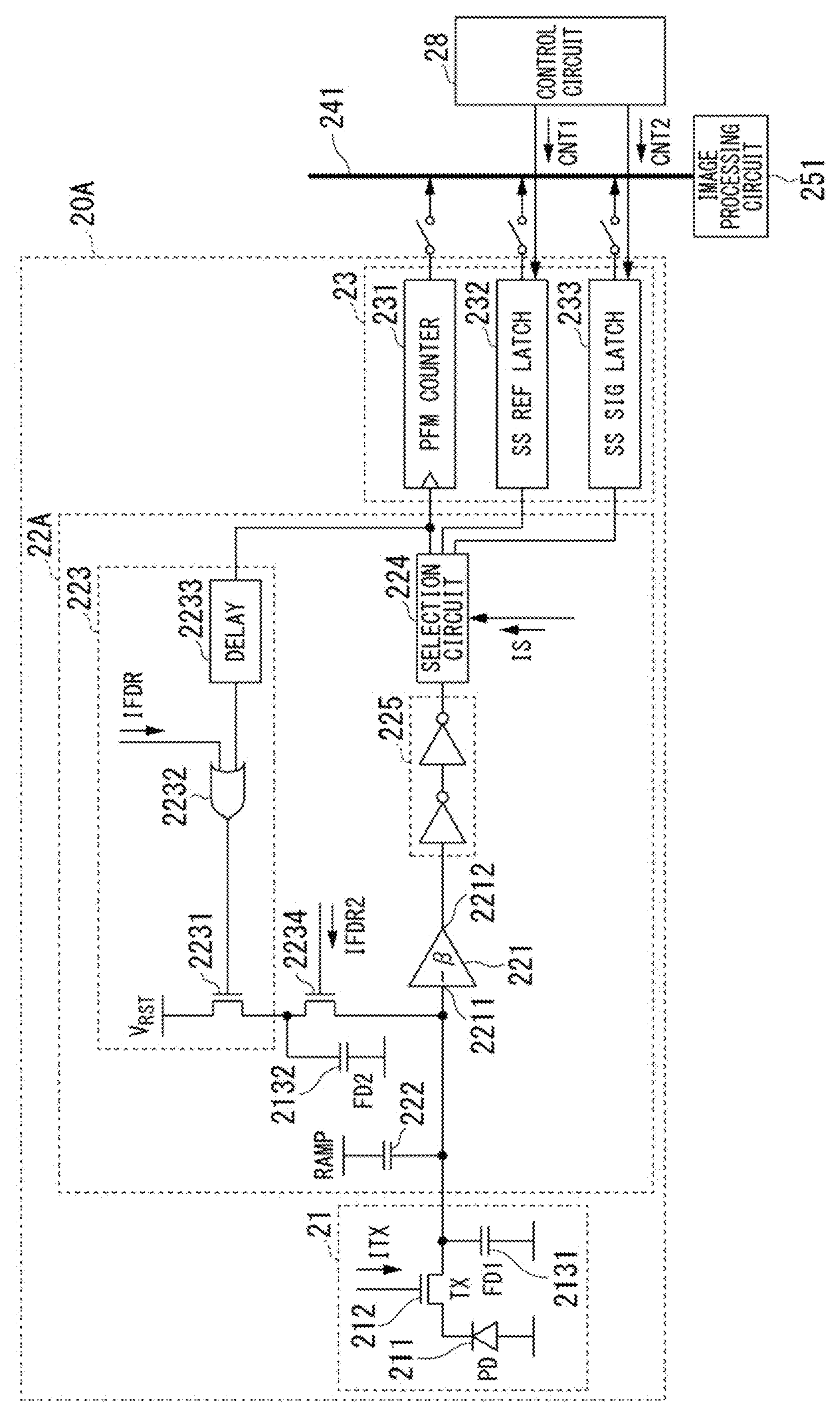
FIG. 12 is a diagram showing an example of a functional configuration of a circuit for each pixel included in an imaging element according to a second embodiment of the present invention.
Figure 15:
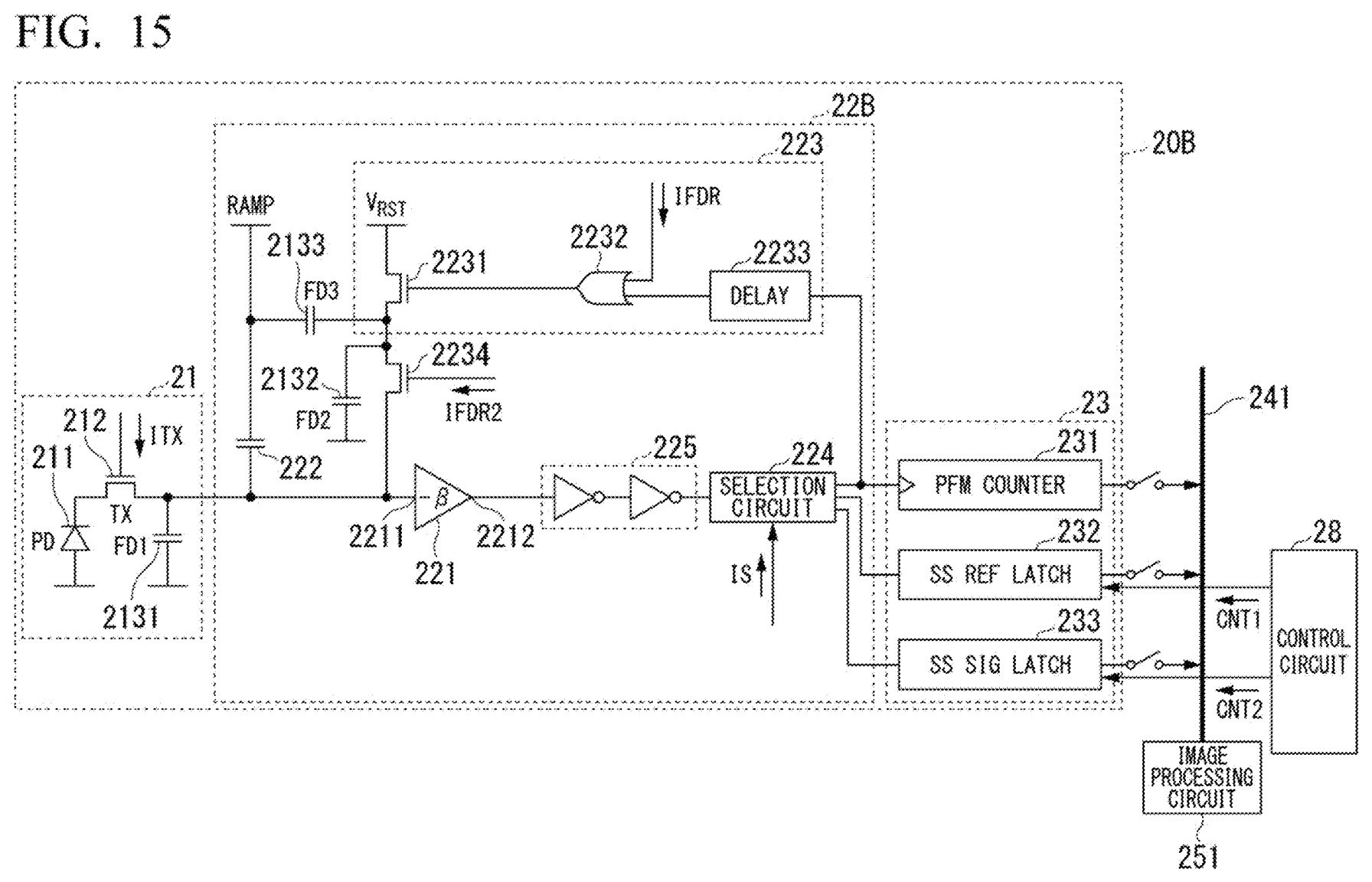

FIG. 15 is a diagram showing an example of a functional configuration of a circuit 20B for each pixel included in an imaging element 1B according to the second embodiment of the present invention. The circuit 20B for each pixel is a modified example of the circuit 20A for each pixel. The imaging element 1B will be described with reference to the drawing. The imaging element 1B differs from the imaging element 1A in that it includes a second capacitor 2133. Components similar to those in the imaging element 1A are given the same reference numerals as those in FIG. 12, and descriptions thereof will be omitted.

One end of the second capacitor 2133 is connected to a connection point between the reset transistor 2231 and the second reset transistor 2234, and a RAMP voltage is applied to the other end.

The imaging element 1B can increase the capacitance of the floating diffusion by including the second capacitor 2133. Furthermore, by including the second capacitor 2133, the imaging element 1B can maintain a ratio (a distribution gain) of a voltage change of the floating diffusion to a change of the RAMP voltage above a certain level even when the capacitance of the floating diffusion increases. Therefore, in SS mode 2, even when the capacitance of the floating diffusion increases, an amplitude of a floating diffusion voltage can be secured without increasing an amplitude of the RAMP voltage.

The imaging element 1B may have a configuration in which the second floating diffusion 2132 is not included.

FIG. 16 is a diagram showing an example of a functional configuration of a circuit 20C for each pixel included in an imaging element 1C according to the second embodiment of the present invention. The circuit 20C for each pixel is a modified example of the circuit 20B for each pixel. The imaging element 1C will be described with reference to the drawing. The imaging element 1C differs from the imaging element 1B in that it includes a self-bias circuit. Components similar to those in the imaging element 1B are given the same reference numerals as those in FIG. 15, and descriptions thereof will be omitted.

The imaging element 1C includes a reset transistor 2231A instead of the reset transistor 2231. Further, the imaging element 1C includes a second reset transistor 2234A instead of the second reset transistor 2234. The imaging element 1C also includes a third capacitor 2132A. Further, the imaging element 1C includes a second capacitor 2133A instead of the second capacitor 2133. Further, the imaging element 1C includes a delay circuit 2232A2233A and a delay circuit 2232B2233B instead of the delay circuit 22322233. The output terminal 2212 of the comparator 221 is fed back to the input terminal 2211 via the reset transistor 2231A and the second reset transistor 2234A.

Here, the delay circuit 2232A2233A and the delay circuit 2232B2233B may be configured to delay only a falling edge of a signal.

One end of the third capacitor 2132A is connected to a connection point between the reset transistor 2231A and the second reset transistor 2234A, and the other end is connected to an FD lifting signal supplied by the delay circuit 2233B via an inverter. The circuit 20C for each pixel raises the FD voltage corresponding to an amplitude of one count in the PFM mode via the third capacitor 2132A by resetting the input terminal 2211 of the comparator 221 by the self-bias circuit and then controlling the FD lifting signal.

Figure 17:
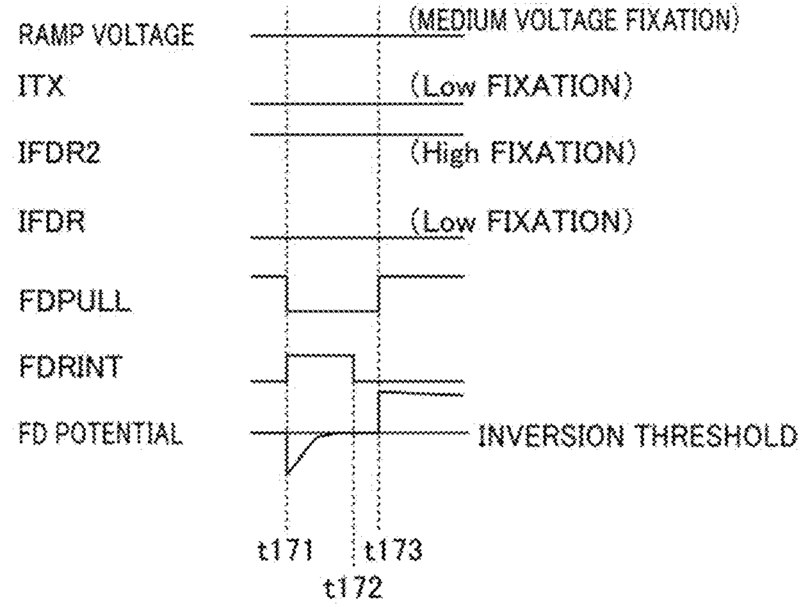
FIG. 17 is a diagram showing an example of a reset operation that occurs during a PFM mode accumulation period according to the second embodiment of the present invention.
Figure 18:
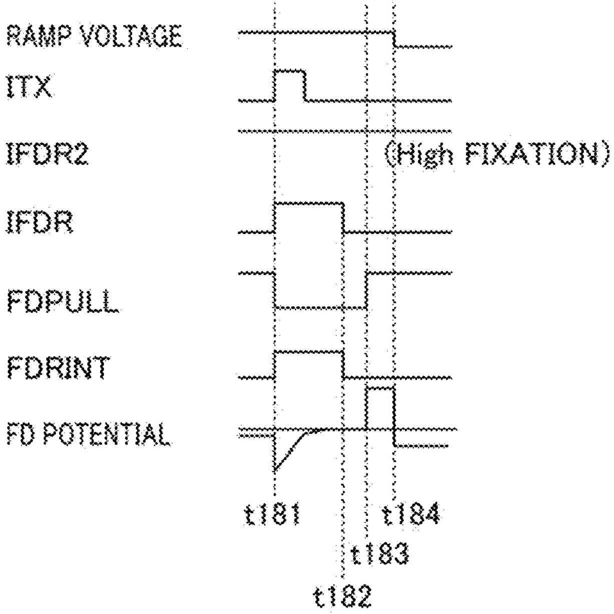
FIG. 18 is a diagram showing an example of a reset operation in an SS mode 2 according to the second embodiment of the present invention.
Figure 19:
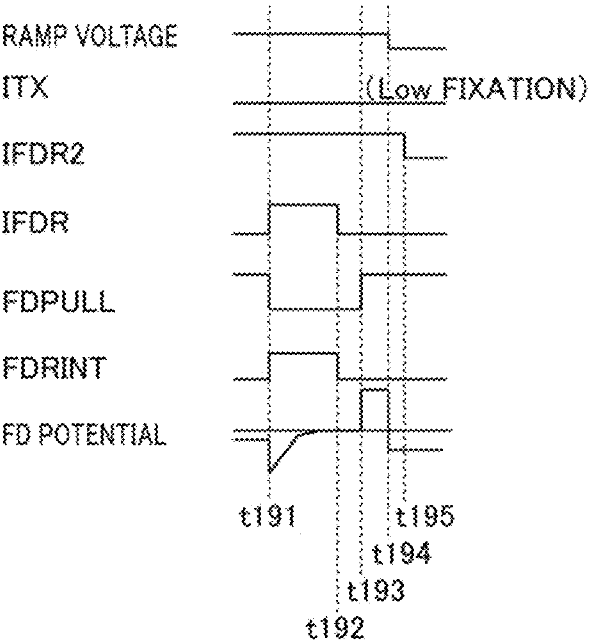
FIG. 19 is a diagram showing an example of a reset operation in an SS mode 1 according to the second embodiment of the present invention.

FIGS. 17, 18, and 19 are diagrams showing an example of an operation related to resetting the floating diffusion when the operation of the imaging element 1A shown in FIG. 13 is applied to the imaging element 1C. A reset operation in Step S202, a reset operation in Step S10, and a reset operation in S30 will be described with reference to the drawing. Regarding the modified example of the operation shown in FIG. 14, the same reset operation is performed in each step, and thus descriptions thereof will be omitted.

FIG. 17 is a diagram showing an example of a reset operation that occurs during the PFM mode accumulation period in Step S202.

In the drawing, the RAMP voltage applied to the capacitor 222 is referred to as a "RAMP voltage," the transfer signal ITX is referred to as "ITX," the FD reset signal IFDR is referred to as "IFDR," the second FD reset signal IFDR2 is referred to as "IFDR2," the FD lifting signal applied to the third capacitor 2132A is referred to as "FDPULL," the voltage input to a gate of the reset transistor 2231A is referred to as "FDRINT," and the voltage of the floating diffusion 2131 is referred to as an "FD voltage."

The charges overflowing from the photodiode 211 are accumulated in the floating diffusion, and the FD voltage reaches the inversion threshold voltage of the comparator 221 at time t171. At this time, the reset signal FDRINT of the floating diffusion rises and the reset transistor 2231A is turned on. At the same time, the lifting signal FDPULL of the FD voltage falls, and fusion reset starts with floating. After a predetermined period of time has passed since the start of reset, the FD voltage becomes approximately equal to the inversion threshold voltage of the comparator 221. At time t172 which is delayed from time t171 by a time determined by the delay circuit 2233A, FDRINT falls, and the reset transistor 2231A turns off.

At time t173 which is delayed from time t172 by a time determined by the delay circuit 2233B, FDPULL rises, thus the FD voltage rises to a voltage higher than the inversion threshold voltage of the comparator 221 by a predetermined voltage, and fusion reset ends with floating.

FIG. 18 is a diagram showing an example of the reset operation of the photodiode 211 and the floating diffusion in SS mode 2 in Step S10.

In the drawing, the RAMP voltage applied to the capacitor 222 is referred to as a "RAMP voltage," the transfer signal ITX is referred to as "ITX," the FD reset signal IFDR is referred to as "IFDR," the second FD reset signal IFDR2 is referred to as "IFDR2," the FD lifting signal applied to the third capacitor 2132A is referred to as "FDPULL," the voltage input to the gate of the reset transistor 2231A is referred to as "FDRINT," and the voltage of the floating diffusion 2131 is referred to as an "FD voltage."

At time t181, the control circuit 28 starts resetting by controlling ITX and IFDR. At this time, the reset signal FDRINT of the floating diffusion rises, and the reset transistor 2231A is turned on. At the same time, the FD voltage lifting signal FDPULL falls, and the fusion reset starts with floating. After a predetermined period of time has passed since the start of reset, the FD voltage becomes approximately equal to the inversion threshold voltage of the comparator 221. Furthermore, since the transfer transistor 212 is also on at this time, the potential of the photodiode 211 is also reset at the same time.

At time t182 which is delayed from time t181 by a time determined by the delay circuit 2233A, FDRINT falls, and the reset transistor 2231A is turned off.

At time t183 which is delayed from time t182 by a time determined by the delay circuit 2233B, FDPULL rises, and the FD voltage rises to a voltage higher than the inversion threshold voltage of the comparator 221 by a predetermined voltage, and fusion reset ends with floating.

The FD voltage is adjusted by adjusting the RAMP voltage at time t184, so that next A/D conversion can be performed.

FIG. 19 is a diagram showing an example of a floating diffusion reset operation in SS mode 1 in Step S30.

In the drawing, the RAMP voltage applied to the capacitor 222 is referred to as a "RAMP voltage," the transfer signal ITX is referred to as "ITX," the FD reset signal IFDR is referred to as "IFDR," the second FD reset signal IFDR2 is referred to as "IFDR2," the FD lifting signal applied to the third capacitor 2132A is referred to as "FDPULL," the voltage input to the gate of the reset transistor 2231A is referred to as "FDRINT," and the voltage of the floating diffusion 2131 is referred to as an "FD voltage."

At time t191, the control circuit 28 begins to reset by controlling IFDR. At this time, the floating diffusion reset signal FDRINT rises and the reset transistor 2231A is turned on. At the same time, the FD voltage lifting signal FDPULL falls, and fusion reset starts with floating. After a predetermined period of time has passed since the start of reset, the FD voltage becomes a voltage approximately equal to the inversion threshold voltage of the comparator 221.

At time t192 which is delayed from time t191 by a time determined by the delay circuit 2233A, FDRINT falls and the reset transistor 2231A is turned off.

At time t193 which is delayed from time t192 by a time determined by the delay circuit 2233B, FDPULL rises, and the FD voltage rises to a voltage higher than the inversion threshold voltage of the comparator 221 by a predetermined voltage, and fusion reset ends with floating.

The FD voltage is adjusted by adjusting the RAMP voltage at time t194, so that the SS mode 1 REF conversion in Step S40 can be performed.

At time t195, the control circuit 28 turns off the second reset transistor 2234A by controlling IFDR2. Thus, the control circuit 28 reduces the capacitance of the floating diffusion.

Here, the reset voltage of the floating diffusion in the imaging element 1B was determined by a predetermined reference voltage $V_{RST}$. Therefore, the reset voltage of the floating diffusion in the imaging element 1B was constant regardless of input and output characteristics of the comparator 221. On the other hand, due to variations in characteristics of the transistors that constitute the comparator 221, the input voltage (the inversion threshold voltage) at which the output of the comparator 221 is inverted may also vary. Since the amount of charges required for the PFM counter 231 to make one count is determined by a difference between the reset voltage of the floating diffusion and the inversion threshold voltage of the comparator 221, similarly, the amount of charges required for the PFM counter 231 to make one count will also vary. In this embodiment, since the comparator 221 is provided for each of the pixels 21, when the inversion threshold voltage of the comparator 221 varies, the amount of charges required for the PFM counter 231 for each pixel to make one count will also vary.

In the imaging element 1C, since the input voltage of the comparator 221 is self-biased to the output voltage during the reset operation, even when the inversion threshold potential of the comparator 221 varies, the difference between the voltage after reset of the floating diffusion and the inversion threshold voltage of the comparator 221 remains approximately constant, and variations in the charges required for counting for each of the pixels 21 can be curbed.

Summary of Effects of Second Embodiment

As described above, according to this embodiment, the imaging element 1A includes the first floating diffusion 2131, the second floating diffusion 2132, and the second reset transistor 2234. The accumulation amount selection part turns on the second reset transistor 2234 in the PFM mode. That is, the imaging element 1A expands the capacitance of the floating diffusion in the PFM mode.

When the capacitance of the floating diffusion is expanded, the number of charges corresponding to one count in PFM mode increases, and thus the number of system saturation charges can be increased.

Further, according to the embodiment described above, the imaging element 1A, the imaging element 1B, and the imaging element 1C perform the A/D conversion in SS mode 2 to detect the charges remaining in the floating diffusion after the PFM mode ends. Therefore, according to this embodiment, it is possible to curb quantization noise that may occur in the PFM mode. Further, according to this embodiment, in the S/N curve, when moving from a region in which the signal of the SS mode is treated as a total signal to a region in which the total signal is calculated using both the signal of the SS mode and the signal of the PFM mode, it is possible to prevent a decrease in S/N due to a sudden increase in noise.

Further, according to the embodiment described above, in the imaging element 1B and the imaging element 1C, due to the RAMP and the capacitance expansion region of the floating diffusion being coupled by a capacitor, when the capacitance of the floating diffusion is expanded, a coupling capacitance between the RAMP and the floating diffusion is also expanded. Therefore, according to this embodiment, even when the capacitance of the floating diffusion is expanded, the distribution gain which is a change in the FD voltage with respect to a change in the RAMP voltage can be maintained above a certain level. Further, according to this embodiment, even when the capacitance of the floating diffusion is increased, there is no need to increase the voltage amplitude of the RAMP signal in accordance with the capacitance of the floating diffusion.

Further, according to the embodiment described above, the imaging element 1C resets the floating diffusion using the self-bias. Therefore, according to this embodiment, variations in the charges required for one count due to variations in the inversion threshold voltage of the comparator 221 can be curbed.

Further, according to the embodiment described above, the imaging element 1A, the imaging element 1B, and the imaging element 1C can perform the REF sampling and the SIG sampling in SS mode 2 at the same reset voltage level only when the PFM has not made even one count. Therefore, only when the PFM has not made even one count, kTC noise generated at the time of reset of SS mode 2 can be canceled (the A/D conversion can be performed with low noise). Furthermore, according to the embodiment described above, the imaging element 1A, the imaging element 1B, and the imaging element 1C can curb a decrease in S/N at a boundary between the region in which the signal of SS mode 1 is treated as a total signal and the region in which the signals of SS mode 1, SS mode 2 and PFM mode are summed, in an S/N curve.

Third Embodiment

FIG. 20 is a diagram showing an example of a functional configuration of a circuit 20D for each pixel included in an imaging element 1D according to a third embodiment of the present invention.

Here, in the SS mode, when the potential of the input terminal 2211 of the comparator 221 becomes larger than a predetermined inversion threshold voltage and the potential of the output terminal 2212 is switched, a through current flows through the comparator 221. The through current continues to flow until the potential of the input terminal 2211 of the comparator 221 becomes smaller than the predetermined inversion threshold voltage by resetting the RAMP voltage. In other words, the through current continues to flow even after it is latched. On the other hand, after the comparator 221 is inverted, the comparator 221 does not necessarily need to determine whether the voltage input to the input terminal 2211 is equal to or higher than the inversion threshold, and the through current that continues to flow after the comparator 221 is inverted may become unnecessary. Therefore, in the third embodiment, a circuit for cutting off the through current is provided. The functional configuration of the circuit 20D for each pixel according to the third embodiment will be described with reference to FIG. 20.

The circuit 20D for each pixel differs from the circuit 20C for each pixel in that it includes a comparator 221D instead of the comparator 221. Furthermore, the circuit 20D for each pixel differs from the circuit 20C for each pixel in that it includes a logic gate 226 in addition to the configuration of the circuit 20C for each pixel. Components similar to those of the circuit 20C for each pixel are designated by the same reference numerals, and descriptions thereof will be omitted.

The comparator 221D includes an input terminal 2211D, an output terminal 2212D, and a current cutoff terminal 2213D. The comparator 221D inverts a level of a voltage output to the output terminal 2212D when the input voltage applied to the input terminal 2211D exceeds a predetermined voltage (the inversion threshold voltage). The voltage output by the comparator 221D is input to the selection circuit 224. Furthermore, the voltage output by the comparator 221D is input to the current cutoff terminal 2213D of the comparator 221D via the logic gate 226.

When the voltage amplification factor of the comparator 221D is small, the voltage output from the comparator 221D may be input to the selection circuit 224 and the logic gate 226 via the amplification circuit 225.

The comparator 221D cuts off the through current flowing in the comparator 221D when a predetermined voltage is input to the current cutoff terminal 2213D.

A current cutoff disabling signal ISD is input to the input terminal of the logic gate 226. The control circuit 28 controls the current cutoff disabling signal ISD so that the voltage that cuts off the through current is not input to the current cutoff terminal 2213D regardless of the potential of the output terminal 2212D of the comparator 221D. For example, in this embodiment, in the PFM mode, the control circuit 28 outputs the current cutoff disabling signal ISD in order to disable current cutoff.

Figure 21:
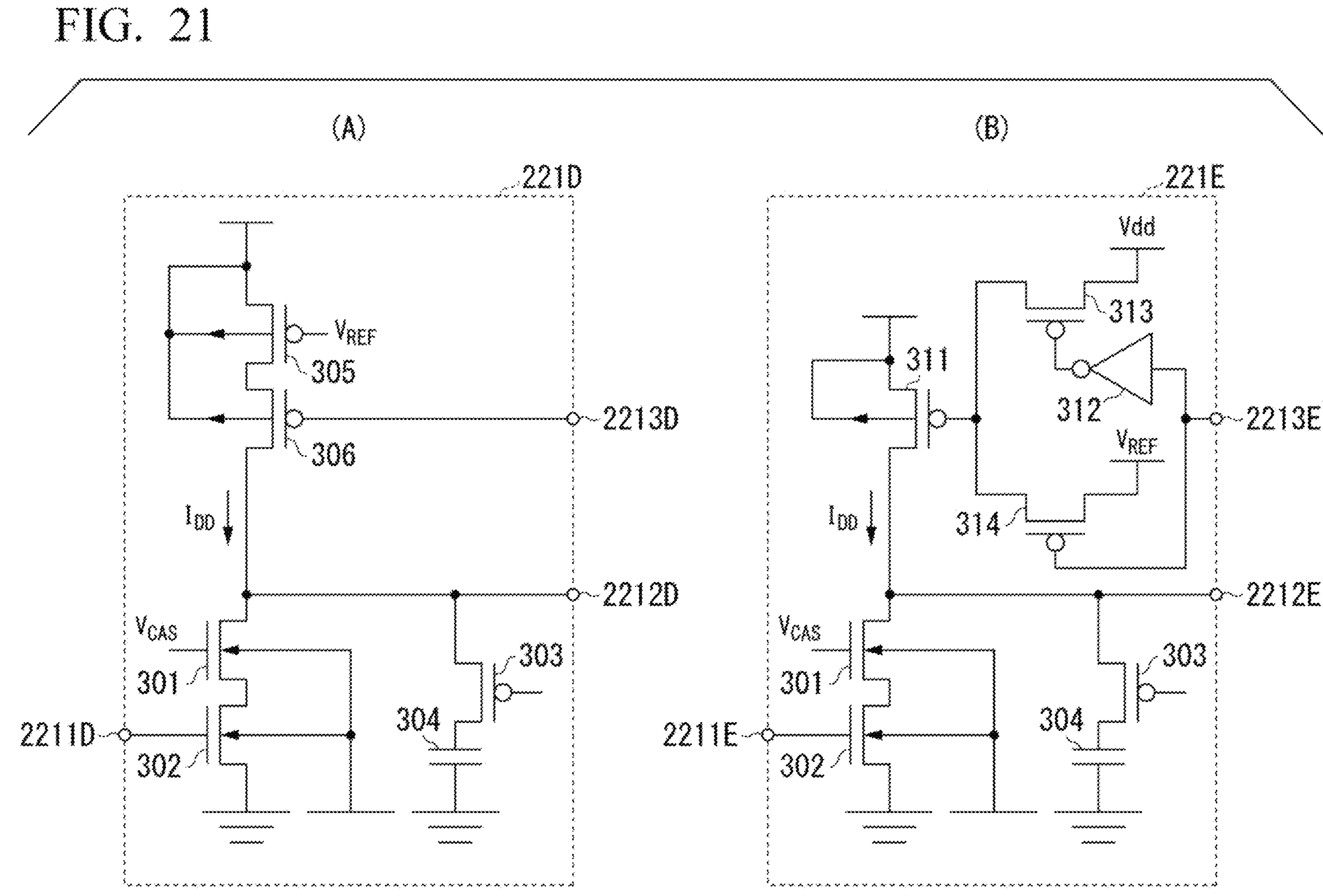
FIG. 21 is a diagram showing an example of a comparator according to the third embodiment of the present invention.

FIG. 21 is a diagram showing an example of the comparator according to the third embodiment of the present invention. FIG. 21(A) is a diagram showing a configuration of the comparator 221D. The comparator 221D includes a transistor 302, a transistor 305, and a transistor 306.

A gate of the transistor 302 is connected to the input terminal 2211D, and a source thereof is grounded. Agate of the transistor 305 is connected to a reference voltage $V_{REF}$, and a source thereof is connected to a power supply. A gate of the transistor 306 is connected to the current cutoff terminal 2213D and is connected between a drain of the transistor 305 and a drain of the transistor 302.

The comparator 221D may include a cascode transistor 301. Furthermore, the comparator 221D may include a capacitor 304 and a transistor 303 that controls a connection between the output terminal 2212D and the capacitor 304.

Before an operation of the SS mode, L is input to the current cutoff terminal 2213D. That is, the transistor 306 is turned on. In this state, a voltage at the output terminal 2212D is H. When a predetermined voltage is applied to the input terminal 2211D and the potential of the input terminal 2211D exceeds the inversion threshold voltage, the voltage of the output terminal 2212D is inverted to L, and a through current $I_{DD}$ flows.

When the voltage at the output terminal 2212D is inverted to L, the output of the logic gate 226 is inverted from L to H, and H is input to the current cutoff terminal 2213D. When H is input to the current cutoff terminal 2213D, the transistor 306 is turned off, and the through current $I_{DD}$ is cut off while the voltage of the output terminal 2212D is maintained at L.

FIG. 21(B) is a diagram showing a configuration of a comparator 221E. The comparator 221E is a modified example of the comparator 221D. Components similar to those of the comparator 221D are designated by the same reference numerals, and descriptions thereof will be omitted.

The comparator 221E differs from the comparator 221D in that it includes a transistor 313, a transistor 314, and an inverter 312 instead of the transistor 306.

Before the operation in the SS mode, L is input to a current cutoff terminal 2213E. That is, the transistor 314 is turned on and the transistor 313 is turned off. Therefore, the reference potential $V_{REF}$ is applied to the gate of the transistor 311.

When a predetermined voltage is applied to an input terminal 2211E and the voltage at the input terminal 2211E exceeds the inversion threshold voltage, the voltage at an output terminal 2212E is inverted to L, and the through current $I_{DD}$ flows. When the voltage at the output terminal 2212D is inverted to L, an output of the logic gate 226 is inverted from L to H, and H is input to the current cutoff terminal 2213E.

When H is input to the current cutoff terminal 2213D, the transistor 314 is turned off and the transistor 313 is turned on. Therefore, a power supply voltage $V_{dd}$ is applied to the gate of the transistor 311. When the power supply voltage $V_{dd}$ is applied to the gate of the transistor 311, the transistor 311 is turned off, and the through current $I_{DD}$ is cut off while the voltage of the output terminal 2212E is maintained at L.

Figure 22:
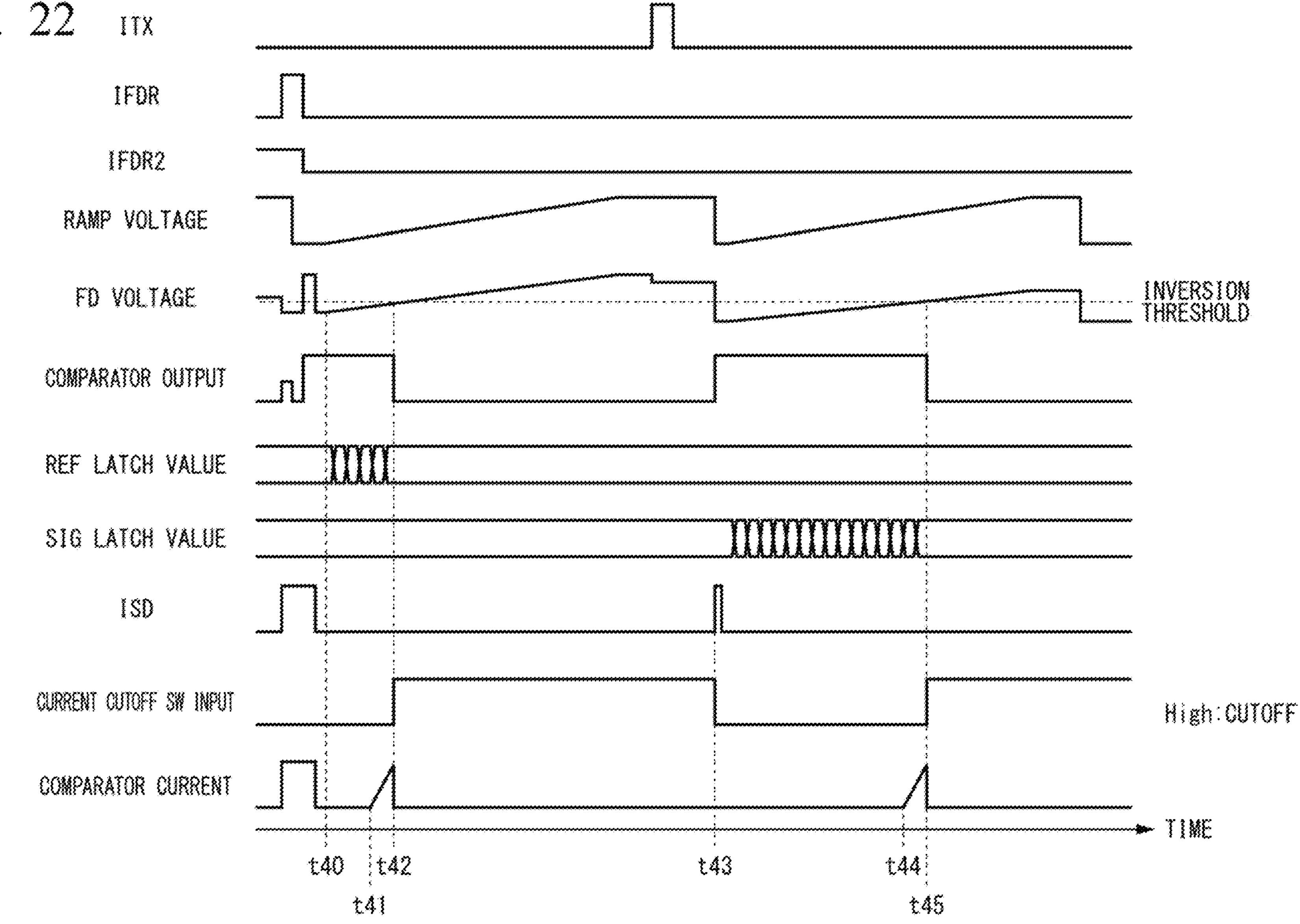
FIG. 22 is a diagram showing an example of an operation in an SS mode according to the third embodiment of the present invention.

FIG. 22 is a diagram showing an example of the operation in the SS mode according to the third embodiment of the present invention. Referring to the drawing, a flow of cutting off the through current $I_{DD}$ flowing in the comparator 221D in the third embodiment will be described.

In this example, an example of the operation in the SS mode will be described. Descriptions of the matters described in FIG. 9 may be omitted.

In the drawing, the transfer signal ITX is referred to as "ITX," the FD reset signal IFDR is referred to as "IFDR," the second FD reset signal IFDR2 is referred to as "IFDR2," the RAMP voltage applied to the capacitor 222 is referred to as "RAMP voltage," the voltage of the floating diffusion 213 is referred to as an "FD voltage," the output voltage of the comparator 221 is referred to as a "comparator output," the value of the SS REF latch 232 is referred to as a "REF latch value," and the value of the SS SIG latch 233 is referred to as a "SIG latch value," and their respective changes over time are shown. Vertical axes of the ITX, IFDR, RAMP voltage, FD voltage, and comparator output are voltages, and the REF latch value and the SIG latch value indicate digital values.

In addition, the current cutoff disabling signal ISD is referred to as "ISD," the voltage of the current cutoff terminal 2213D is referred to as a "current cutoff SW input," and the through current $I_{DD}$ is referred to as a "comparator current," and their respective changes over time are shown. For both the ISD and the current cutoff SW input, vertical axes are shown as voltages. A comparator current is shown on the vertical axis as a current. The current cutoff SW input is in a cutoff state when it is at H, and is in a conduction state when it is at L.

Before time t40, the control circuit 28 resets the voltage of the floating diffusion 213 by controlling the FD reset signal IFDR, the FD reset signal IFDR2, and the RAMP voltage. At this time, the control circuit 28 resets the floating diffusion 218 while maintaining the current cutoff SW input in the conduction state by controlling the current cutoff disabling signal ISD.

At time t40, the control circuit 28 slowly increases the RAMP voltage. At time t32, at the same time as increasing the RAMP voltage, the control circuit 28 changes the SS REF latch 232 at a predetermined period.

At time t41, the comparator current begins to flow.

At time t42, when the FD voltage exceeds the inversion threshold voltage, the output of the comparator is inverted, and the current cutoff SW input is switched to a cutoff state. When the current cutoff SW input is switched to the cutoff state, the comparator current is cut off.

At time t43, the control circuit 28 switches the current cutoff SW input from the cutoff state to the conduction state by controlling the current cutoff disabling signal ISD before increasing the RAMP voltage.

At time t44, the comparator current begins to flow. At time t45, when the FD voltage exceeds the inversion threshold voltage, the output of the comparator is inverted and the current cutoff SW input is switched to the cutoff state. When the current cutoff SW input is switched to the cutoff state, the comparator current is cut off.

Summary of Effects of Third Embodiment

As described above, according to this embodiment, the comparator 221D includes the current cutoff terminal 2213D. The comparator 221D cuts off the through current $I_{DD}$ flowing through the comparator 221D by controlling the current cutoff terminal 2213D.

Therefore, the imaging element 1D including the comparator 221D can curb power consumption. Furthermore, due to the through current $I_{DD}$ being cut off, the imaging element 1D including the comparator 221D can curb a voltage drop or a voltage increase in the power supply and GND wirings that may occur when the through current $I_{DD}$ flows.

Further, according to this embodiment, the control circuit 28 controls the current cutoff terminal 2213D by controlling the current cutoff disabling signal ISD. The control circuit 28 does not perform cutoff of the current by controlling the current cutoff disabling signal ISD in the PFM mode.

The control circuit 28 can cut off the current only in the SS mode by controlling the current cutoff disabling signal ISD.

Fourth Embodiment

Figures 23, 24:
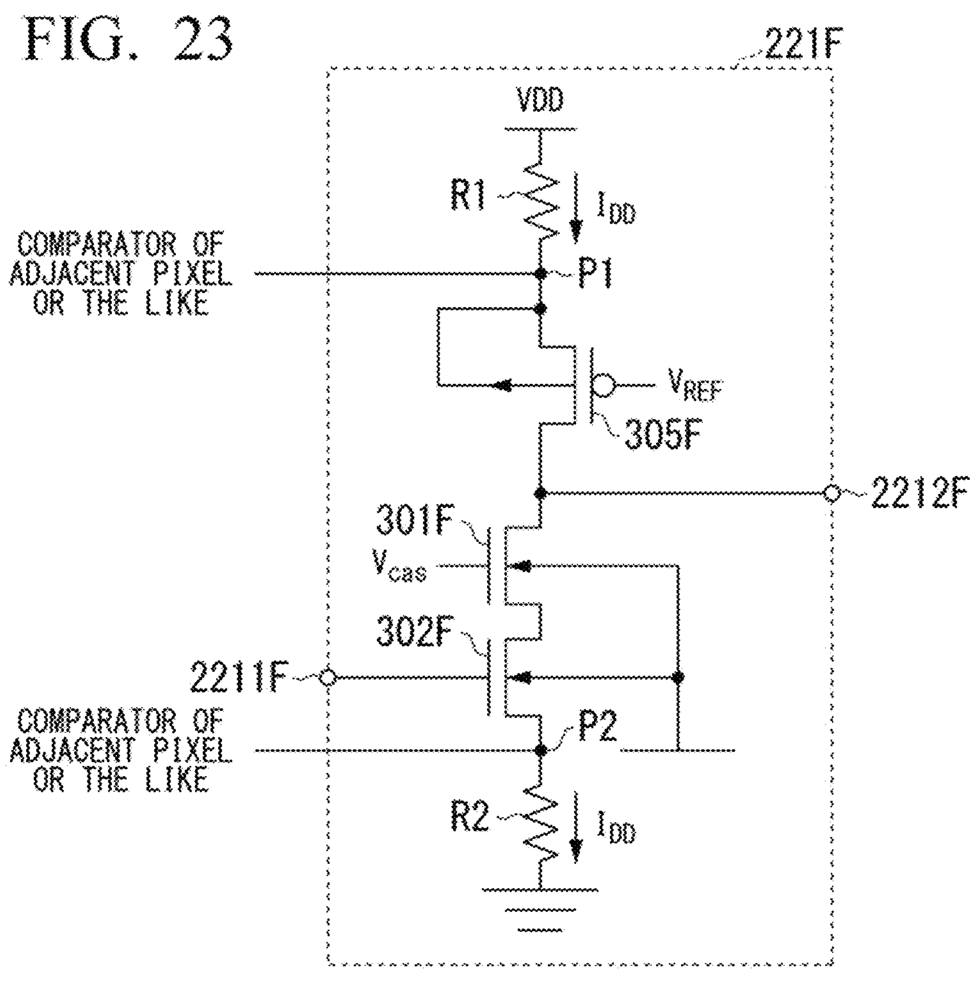
FIG. 23 is a diagram showing an example of a comparator according to a fourth embodiment of the present invention.
FIG. 24 is a diagram showing an example of a power supply and a GND wiring according to the fourth embodiment of the present invention.

FIG. 23 is a diagram showing an example of a comparator 221F according to a fourth embodiment of the present invention. The comparator 221F is an example of comparator 221.

Here, when a through current $I_{DD}$ occurs in the comparator 221F, a voltage drop may occur according to the value of parasitic resistor of the wiring (hereinafter, referred to as an IR drop). When the IR drop occurs, a problem may occur in which a timing at which the output of the comparator 221 is inverted changes according to a voltage fluctuation due to the IR drop, even though the value of the reference voltage $V_{REF}$ is kept constant. Therefore, the fourth embodiment provides a circuit that curbs a change in the timing at which the output of the comparator 221 is inverted even though the IR drop occurs. The comparator 221F according to the fourth embodiment will be described with reference to FIG. 23.

The comparator 221F includes a transistor 302F and a transistor 305F. Agate of the transistor 302F is connected to an input terminal 2211F, and a source thereof is grounded. Agate of the transistor 305F is connected to the reference voltage $V_{REF}$, and a source thereof is connected to a power supply.

The comparator 221F may include a transistor 301F between the transistor 302F and the transistor 305F.

In a process in which the comparator 221F is formed, a parasitic resistor R1 and a parasitic resistor R2 are formed. The parasitic resistor R1 is a resistance component formed between the source of the transistor 305F and the power supply. The parasitic resistor R2 is a resistance component formed between the source of the transistor 302F and a ground point.

In the comparator 221221F of the pixel 21 around the pixel 21 of interest, when the voltage applied to the input terminal 2211F becomes larger than the inversion threshold voltage, a current $I_{DD}$ flows through the parasitic resistor R1. When the current $I_{DD}$ flows through the parasitic resistor R1, a voltage at a point P1 decreases from the power supply voltage by a voltage obtained by multiplying a resistance value of the parasitic resistor R1 by a current value of the current $I_{DD}$.

As the voltage at the point P1 decreases, the inversion threshold voltage for inverting an output terminal 2212F decreases. When the inversion threshold voltage for inverting the output terminal 2212F decreases, in the pixel 21 of interest, the timing at which the output terminal 2212F inverts in the SS mode is earlier than an original timing, which may cause a problem in which an A/D conversion result in the pixel 21 becomes low.

Furthermore, in the comparator 221221F of a pixel surrounding the pixel 21 of interest, when the voltage applied to the input terminal 2211F becomes larger than the inversion threshold voltage, the current $I_{DD}$ flows through the parasitic resistor R2. When the current $I_{DD}$ flows through the parasitic resistor R2, a voltage at a point P2 increases from the power supply voltage by a voltage obtained by multiplying a resistance value of the parasitic resistor R2 by the current value of the current $I_{DD}$.

As the voltage at point P2 increases, the inversion threshold voltage for inverting the output terminal 2212F increases. When the inversion threshold voltage for inverting the output terminal 2212F increases, in the pixel of interest, the timing at which the output terminal 2212F inverts in the SS mode is delayed from an original timing, which may cause a problem in which the A/D conversion result at that pixel becomes high.

In this embodiment, even when the current $I_{DD}$ flows, the threshold value for inverting the output terminal 2212F does not change, and thus a ratio between the voltage dropping at the point P1 and the voltage rising at the point P2 is set to a constant ratio by setting a ratio between the parasitic resistor R1 and the parasitic resistor R2 to a constant ratio determined from characteristics of the transistors constituting the comparator and the reference voltage $V_{REF}$.

FIG. 24 is a diagram showing an example of a power supply and a GND wiring according to the fourth embodiment of the present invention. The example shown in the drawing is an example of a wiring in the pixel chip 11 or the circuit chip 12.

A wiring 40 is an example of a power supply or GND wiring. The parasitic resistor R1 and the parasitic resistor R2 described with reference to FIG. 23 are determined by a thickness of the wiring disposed in a mesh shape or horizontally and vertically. The pixel chip 11 or the circuit chip 12 adjusts the resistance value of the parasitic resistor R1 and the resistance value of the parasitic resistor R2 by adjusting a width W1 and a width W2 of the wiring 40. Although the drawing shows an example in which the power supply or GND wiring is constituted using only one wiring layer, the power supply or GND wiring may be constituted using two or more wiring layers.

Summary of Effects of Fourth Embodiment

As described above, according to this embodiment, the pixel chip 11 or the circuit chip 12 can curb fluctuations in the threshold value for inverting the output terminal 2212F by adjusting the resistance values of the parasitic resistor R1 and the parasitic resistor R2 to a constant ratio. Therefore, according to this embodiment, it is possible to curb occurrence of a problem in which pixel values of an output image are shifted due to an increase or decrease in the A/D conversion result.

Further, according to this embodiment, the pixel chip 11 or the circuit chip 12 adjusts the resistance values of the parasitic resistor R1 and the parasitic resistor R2 by adjusting the width W1 and the width W2 of the wiring 40. Therefore, according to this embodiment, the resistance values of the parasitic resistor R1 and the parasitic resistor R2 can be easily adjusted.

Fifth Embodiment

FIG. 25 is a diagram showing an example of a comparator 221G according to a fifth embodiment of the present invention.

In the PFM mode, when a transistor connected to the input terminal 2211 of the comparator 221 is an n-channel FET, a current flows in the comparator 221 during the charge accumulation period, and no current flows after the voltage at the input terminal 2211 reaches the inversion threshold voltage. Therefore, until the voltage at the input terminal 2211 reaches the inversion threshold voltage, the current continues to flow through the comparator 221, resulting in an increase in power consumption. Therefore, the fifth embodiment provides a circuit that reduces power consumption during an operation in the PFM mode. The comparator 221G according to the fifth embodiment will be described with reference to FIG. 25.

FIG. 25(A) is a diagram showing an example of a circuit configuration of the comparator 221G. The comparator 221G includes a transistor 302G and a transistor 305G.

The transistor 302G is a p-channel FET. Agate of the transistor 302G is connected to an input terminal 2211G, and a source thereof is connected to the power supply. The transistor 305G is an n-channel FET. Agate of the transistor 305G is connected to the reference voltage $V_{REF}$, and a source thereof is grounded. A drain of the transistor 302G and a drain of the transistor 305G are connected to each other and also connected to an output terminal 2212G.

FIG. 25(B) is a diagram showing an example of an operation of the comparator 221G in the PFM mode. In the drawing, the voltage of the floating diffusion 213 is referred to as an "FD voltage," the output voltage of the comparator 221G is referred to as a "comparator output," the current flowing through the comparator 221G is referred to as a "comparator current," and the value of the PFM counter 231 is referred to as a "counter," and their respective changes over time are shown. Vertical axes of the FD voltage, comparator output, and comparator current are voltages, and the counter indicates the value of the counter.

At time t50, when light is incident on the photodiode 211 and the photodiode 211 starts generation and overflowing of charges, the FD voltage begins to drop.

At time t51, the FD voltage reaches the inversion threshold voltage, the output of the comparator 221G is switched to H, and a current begins to flow in the comparator 221G.

At time t52, when the FD voltage is reset by the reset transistor 2231 connected to the output terminal of the comparator 221G, as the output of the comparator 221G is switched to L, the comparator current becomes zero and the FD voltage starts to drop again.

At time t53, when the FD voltage reaches the inversion threshold voltage, the counting-up of the counter and the resetting of the FD voltage are similarly repeated.

Compared to a case in which the transistor connected to the input terminal 2211 of the comparator 221 is an n-channel FET, in this embodiment, since the transistor connected to the input terminal 2211G of the comparator 221G is a p-channel FET, no comparator current flows while charges are accumulated in the floating diffusion 213.

FIG. 26 is a diagram showing a modified example of the comparator according to the fifth embodiment of the present invention. In the example shown in FIG. 25, the transistor 302G which is a p-channel FET is connected to the input terminal 2211G of the comparator 221G. Since the input terminal 2211G of the comparator 221G is connected to the floating diffusion 213, the transistor 302G is provided in the pixel chip 11. When the pixels of the pixel chip 11 are formed of only n-channel FETs, using of a p-channel FET for the transistor 302G complicates the process and increases costs. Further, it becomes necessary to add a separation region between a pWell and an nWell by adding a p-channel FET, and it leads to an increase in a pixel area. Therefore, in the example shown in FIG. 26, a comparator 221H has a configuration in which an n-channel FET is used for a transistor connected to an input terminal 2211H, thereby providing a circuit that further reduces power consumption.

FIG. 26(A) is a diagram showing a circuit configuration of the comparator 221H. The comparator 221H includes a transistor 302H, a transistor 305H, a switch 308H, and a switch 309H.

The transistor 302H is an n-channel FET, and the transistor 305H is a p-channel FET. Agate of the transistor 302H is connected to the input terminal 2211H, and a source thereof is grounded. Agate of the transistor 305H is connected to the reference potential $V_{REF}$, and a source thereof is connected to the power supply. A drain of the transistor 302H and a drain of the transistor 305H are connected to each other and also connected to an output terminal 2212H.

The switch 308G308H and the switch 309G309H may be provided outside the comparator 221G221H. The switch 308G308H and the switch 309G309H may be provided in the control circuit 2928 around the pixel, or may be provided in the pixel 21, for example.

In this example, the reference voltage $V_{REF}$ includes an SS mode reference voltage $V_{REF\_SS}$ and a PFM mode reference voltage $V_{REF\_PFM}$, and the switch 308H and the switch 309H select which reference voltage $V_{REF}$ the gate of the transistor 305H is connected to.

The switch 308H is controlled by the control circuit 28, and when the switch 308H is on, the gate of the transistor 305H is connected to the SS mode reference voltage $V_{REF\_SS}$.

The switch 309H is controlled by the control circuit 28, and when the switch 309H is on, the gate of the transistor 305H is connected to the PFM mode reference voltage $V_{REF\_PFM}$.

The SS mode reference voltage $V_{REF\_SS}$ is lower than the PFM mode reference voltage $V_{REF\_PFM}$. Therefore, the current flowing through the comparator 221H is smaller when the gate of the transistor 305H is connected to the PFM mode reference voltage $V_{REF\_PFM}$ than when the gate of the transistor 305H is connected to the SS mode reference voltage $V_{REF\_SS}$.

There is a risk of worsening noise by reducing the current in PFM mode compared to the SS mode, but in PFM mode, the number of electrons per one count is large, and optical shot noise becomes dominant, and thus an effect thereof is small.

FIG. 26(B) is a diagram showing an example of the operation of the comparator 221H in the PFM mode. In the drawing, the voltage of the floating diffusion 213 is referred to as an "FD voltage," the output voltage of the comparator 221G is referred to as a "comparator output," the current flowing through the comparator 221G is referred to as a "comparator current," and the value of the PFM counter 231 is referred to as a "counter," and their respective changes over time are shown. Vertical axes of the FD voltage, the comparator output, and the comparator current are voltages, and the counter indicates the value of the counter.

A waveform W61 shown in the comparator current is a waveform when the gate of the transistor 305H is connected to the SS mode reference voltage $V_{REF\_SS}$. A waveform W62 is a waveform when the gate of the transistor 305H is connected to the PFM mode reference voltage $V_{REF\_PFM}$.

At time t60, when light is incident on the photodiode 211 and the photodiode 211 starts generation of charges, the FD voltage begins to drop. At time t60, since the comparator output is L, a current according to the reference voltage $V_{REF}$ flows in the comparator 221H. At time t60, a current value of the waveform W61 is smaller than the current value of the waveform W62.

At time t61, when the FD potential reaches the inversion threshold voltage, the output of the comparator 221H is switched to H, and the current in the comparator 221H begins to decrease.

At time t62, when the FD voltage is reset by the reset transistor 2231 connected to the output terminal of the comparator 221H, as the output of the comparator 221H is switched to L, the comparator current becomes a current according to the reference voltage $V_{REF}$, and the FD voltage begins to drop again.

Similarly, when the FD voltage reaches the inversion threshold voltage at time t63, the counting-up of the counter and the resetting of the FD voltage are repeated.

Summary of Effects of Fifth Embodiment

As described above, according to this embodiment, the comparator 221G can reduce power consumption during the PFM operation using the transistor 302G which is a p-channel FET for the input terminal 2211G.

In addition, the comparator 221H can reduce power consumption during the PFM operation without using a p-channel FET for a transistor connected to the floating diffusion 213.

Sixth Embodiment

Figure 27:
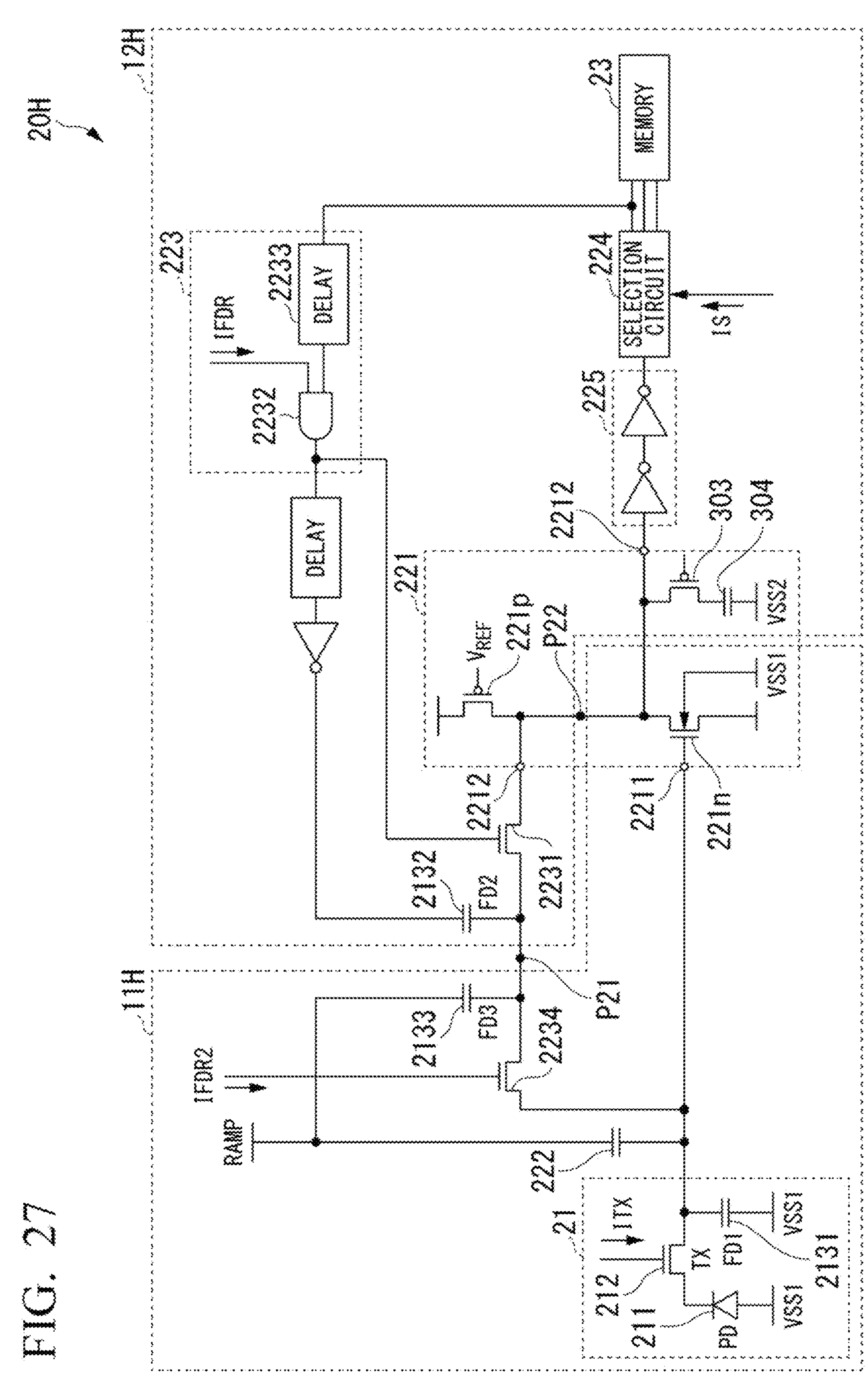
FIG. 27 is a diagram showing a joining portion of a substrate according to a sixth embodiment of the present invention.

FIG. 27 is a diagram showing a joining portion of a substrate according to a sixth embodiment of the present invention.

As shown in the drawing, a first floating diffusion 2131 and a source of a second reset transistor 2234 are connected to the input terminal 2211 of the comparator 221. A gate of an n-channel FET 221*n* is connected to the input terminal 2211 of the comparator 221.

Here, a wiring that connects the floating diffusion 213, the source of the second reset transistor 2234, and the gate of the n-channel FET 221*n* is desirably short in order to curb parasitic capacitance. Therefore, the second reset transistor 2234 and the comparator 221 are preferably formed on the pixel chip 11 including the pixels 21. On the other hand, since a region in which the pixels 21 of a pixel chip 1111H are arranged is formed of a p-type well suitable for forming an n-channel FET, it is not desirable to include a p-channel FET 221*p* in the pixel chip 11H.

Therefore, in this embodiment, a connection point P22 is provided within the comparator 221. Further, a connection point P21 is provided between the second floating diffusion 2132 and the third floating diffusion 2133.

The reset transistor 2231 may be provided within the pixel chip 11. When the reset transistor 2231 is provided within the pixel chip, instead of the connection point P21, a connection point P21A and a connection point P21B may be respectively provided at two places between the reset transistor 2231 and the output terminal 2212, and between the capacitor 2132 and an inverter connected thereto. In this case, the capacitor 2132 is present on the pixel chip 11. Further, P21A and P22 may be the same connection point.

Furthermore, as a modified example of the case in which the reset transistor 2231 is provided in the pixel chip, a connection point P21C may be provided between the capacitor 2132 and a branch point connected to the floating diffusion, instead of the connection point P21B. In this case, the capacitor 2132 is present on the circuit chip.

A circuit 20H for each pixel in this embodiment is divided into a circuit for each pixel provided on the pixel chip 11H and a circuit for each pixel provided on a circuit chip 12H with connection points P21 and P22 as boundaries. A ground point on the pixel chip 11H side is referred to as a ground point VSS1, and a ground point on the circuit chip 12H side is referred to as a ground point VSS2.

In order to easily transfer charges generated by the photodiode 211 to the first floating diffusion 2131, a voltage at the ground point VSS1 may be lower than a voltage at the ground point VSS2. For example, while the ground point VSS2 is 0V, the ground point VSS1 may be set to −2V

Summary of Effects of Sixth Embodiment

As described above, according to this embodiment, the first floating diffusion 2131, the second reset transistor 2234, and the n-channel FET 221*n* are formed on the pixel chip 11H on the same chip. Therefore, according to this embodiment, it is possible to curb an increase in the capacitance of the first floating diffusion 2131 that occurs by providing a connection point on the wiring connecting the first floating diffusion 2131, the second reset transistor 2234, and the n-channel FET 221*n*. Therefore, it is possible to curb an increase in a noise value of the noise generated in the comparator 221 in terms of the number of input electrons.

Further, according to this embodiment, in the circuit 20H for each pixel, the ground point VSS1 of the pixel chip 11H and the ground point VSS2 of the circuit chip 12H have different voltages. Specifically, the ground point VSS1 is set 2V lower than the ground point VSS2. Therefore, according to this embodiment, charges can be efficiently transferred from the photodiode 211 to the first floating diffusion 2131.

The use of a triple well structure is avoided by not using multiple voltages at the ground point of the circuit 20H for each pixel in the circuit chip 12H. Thus, it is possible to curb an increase in area due to addition of a well separation region in a pixel region, and it is also possible to curb an increase in the pixel area. Similarly, in the circuit 20H for each pixel of the pixel chip 11H, it is possible to avoid adding a well separation region and to curb an increase in the pixel area by not using multiple voltages at the ground point.

Seventh Embodiment

In this embodiment, a PFM counter 231 is used in the PFM mode, and the SS REF latch 232 and the SS SIG latch 233 are used in the SS mode. That is, the PFM counter 231, and the SS REF latch 232 and the SS SIG latch 233 are used exclusively in the SS mode. Here, a ratio of the memory 23 to a size of the circuit 20 for each pixel is large, and reducing a size of the memory 23 leads to reducing a size of the circuit 20 for each pixel and, in turn, a size of one pixel. In this embodiment, the memory 23 is shared in the PFM mode and the SS mode. An example in which the memory 23 is shared in the PFM mode and the SS mode will be described with reference to FIGS. 28 to 31.

Figures 28, 29:
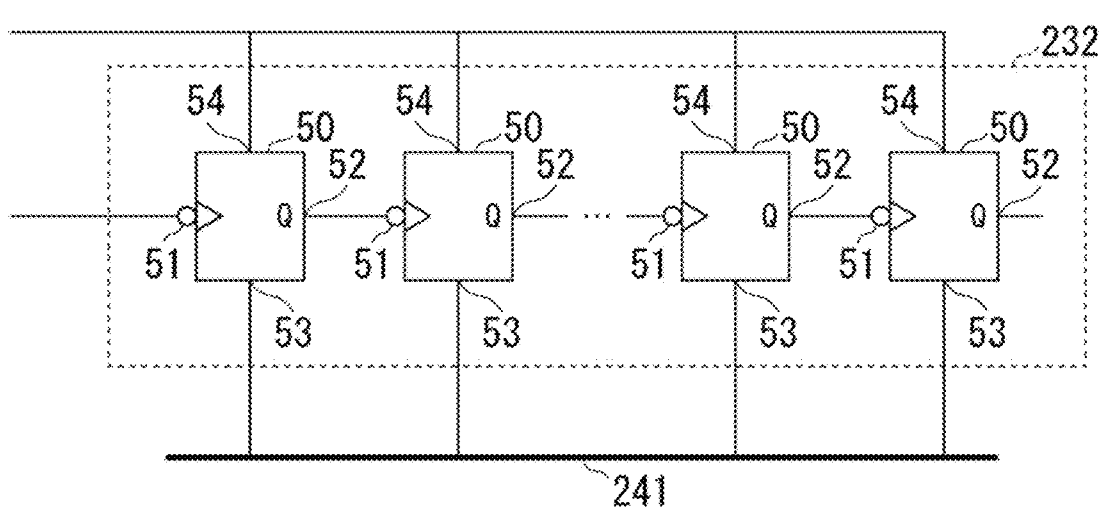
FIG. 28 is a diagram showing a configuration of a latch according to a seventh embodiment of the present invention.
FIG. 29 is a diagram showing a configuration of a counter circuit per 1 bit according to the seventh embodiment of the present invention.

FIG. 28 is a diagram showing a configuration of the PFM counter 231 according to the seventh embodiment of the present invention. The PFM counter 231 includes a plurality of flip-flops 50. Each of the flip-flops 50 is, for example, a T-FF (a toggle flip-flop). The number of bits that the counter can count is determined by the number of flip-flops 50 that the counter has.

The flip-flop 50 is a master-slave type flip-flop. The flip-flop 50 includes a CLK terminal 51, a Q terminal 52, a data input and output terminal 53, and a CLR terminal 54.

The PFM counter 231 has the flip-flops 50 connected in series. Specifically, the Q terminal 52 of the previous stage is connected to the CLK terminal 51, and the CLK terminal of the latter stage is connected to the Q terminal 52. The data input and output terminal 53 is connected to a data bus 241. The CLR terminal 54 is controlled by the control circuit 28.

FIG. 29 is a diagram showing a configuration of a counter circuit per one bit according to the seventh embodiment of the present invention.

Each of the flip-flops 50 includes a latch 510, a latch 520, a transistor 531, a transistor 532, and a switch 533. The latch 510 includes an inverter 511, a NOR gate 513, and a transistor 512. The latch 520 includes an inverter 521, an inverter 523, and a transistor 522.

As shown in the drawing, one bit of the flip-flop 50 is configured of two latches including the latch 510 and the latch 520.

Figure 30:
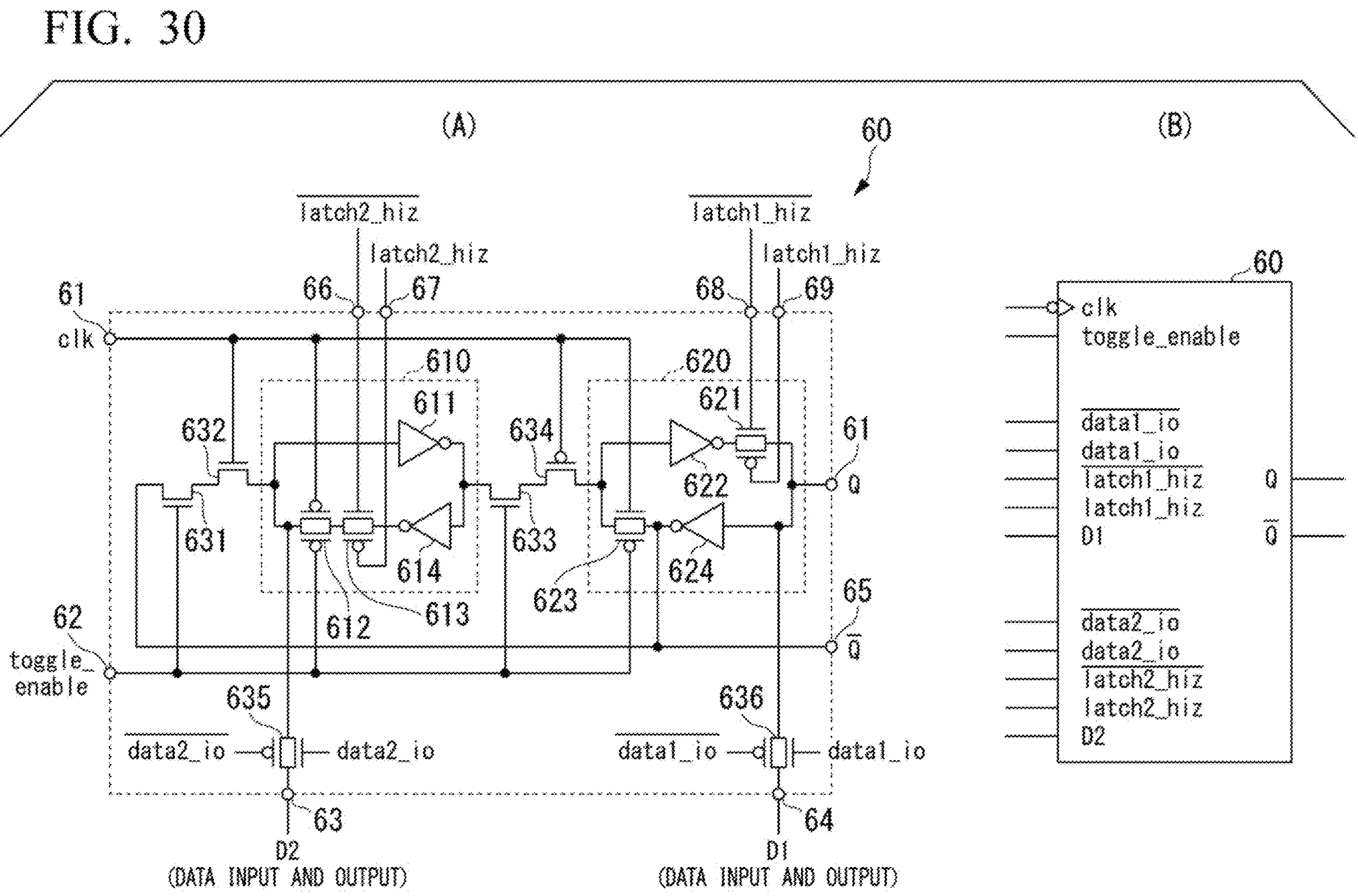
FIG. 30 is a diagram showing a configuration of a shared memory element according to the seventh embodiment of the present invention.

FIG. 30 is a diagram showing a configuration of a shared memory element 60 according to the seventh embodiment of the present invention. The shared memory element 60 shown in the drawing includes two latches like the flip-flop 50, but differs from the flip-flop 50 in that it includes two data input and output terminals.

In this embodiment, the shared memory element 60 can be used as a 1-bit counter, and can also be used as a 2-bit latch by separating the latch 510 and the latch 520 with a switch. That is, 1 bit of the counter and 2 bits of the latch are shared.

FIG. 30(A) is a diagram showing an example of a circuit configuration of the shared memory element 60. The shared memory element 60 includes a selection terminal 66, a selection terminal 67, a selection terminal 68, and a selection terminal 69. The control circuit 28 controls data input to and output from a data input and output terminal 63 and a data input and output terminal 64 by controlling each of the selection terminals.

The shared memory element 60 includes a counter enabling terminal 62. The control circuit 28 selects whether the shared memory element 60 is used as the PFM counter 231, the SS REF latch 232, or the SS SIG latch 233 by controlling the counter enabling terminal 62.

The shared memory element 60 does not have a terminal corresponding to the CLR terminal 54 that the flip-flop 50 has. When the counter is cleared, the control circuit 28 resets the counter by writing L (zero) from the data input and output terminal 63.

FIG. 30(B) is a diagram showing an example of the input and output terminal of the shared memory element 60.

In this embodiment, a configuration in which 1 bit of the counter and 2 bits of the latch are shared is shown, but as a modified example, any one of the latch 610 and the latch 620 may be used as a latch for the SS mode. That is, a configuration may be adopted in which 1 bit of the counter and 1 bit of the latch are shared.

In addition, as another modified example, a part or all of the switch configured only with a plurality of n-channel FETs and the switch configured only with p-channel FETs used in this embodiment may be replaced with a transmission gate.

FIG. 31 is a diagram showing the overall configuration of a shared memory 600 according to the seventh embodiment of the present invention. As shown in the drawing, the shared memory 600 includes a plurality of shared memory elements 60.

For example, when the imaging element 1 is configured with a 12-bit counter and a 24-bit latch, the shared memory 600 includes 12 shared memory elements 60.

Summary of Effects of Seventh Embodiment

As described above, according to this embodiment, the circuit can be configured with the smaller number of transistors than when the flip-flop 50 is employed for the bits of the counter by employing the shared memory element 60. Therefore, the memory 23 including the shared memory element 60 can have a small circuit area.

Although one embodiment of the present invention has been described above in detail with reference to the drawings, the specific configuration is not limited to that described above, and various design changes can be made without departing from the gist of the invention.

Industrial Applicability

According to the present invention, readout noise can be curbed even when the accumulation part has a large capacitance.

Reference Signs List

1 Imaging element
11 Pixel chip
12 Circuit chip
20 Circuit for each pixel
21 Pixel
22 ADC
23 Memory
24 Readout circuit
251 Image processing circuit
252 Frame memory
26 IF
27 Driver
28 Control circuit
29 Circuit for each element
31 Photoelectric conversion region
32 Pixel separation region
33 Accumulation region
34 Overflow transfer path region
211 Photodiode
212 Transfer transistor
213 Floating diffusion
221 Comparator
222 Capacitor
223 Reset circuit
224 Selection circuit
225 Amplification circuit
231 PFM counter
232 SS REF latch

233 SS SIG latch
241 Data bus
242 Peripheral circuit

The invention claimed is:

1. An imaging element comprising:

a photoelectric conversion part configured to convert light into charges;

an accumulation part in which the charges from the photoelectric conversion part are accumulated;

a transfer path part which is a transfer path for transferring charges from the photoelectric conversion part to the accumulation part and has a lower potential than a pixel separation region formed around the photoelectric conversion part;

a measurement part configured to measure the number of times a predetermined amount of charges is accumulated in the accumulation part and to measure an amount of charges accumulated in the photoelectric conversion part; and a comparator including a first input terminal connected to the accumulation part, a second input terminal to which a predetermined reference potential is applied, and an output terminal which outputs a potential based on a potential of the first input terminal and a potential of the second input terminal, wherein (i) a signal based on the number of times the predetermined amount of charges is accumulated in the accumulation part measured by the measurement part and (ii) a signal based on the amount of charges accumulated in the photoelectric conversion part measured by the measurement part are output within one frame period, and wherein the measurement part (i) changes a potential applied to the first input terminal by way of a ramp voltage applied simultaneously with the predetermined reference potential being applied to the second input terminal and (ii) measures the amount of charges accumulated in the photoelectric conversion part on the basis of a time until the potential of the output terminal changes.

2. The imaging element according to claim 1, wherein the transfer path part is a region having a lower impurity concentration than in the pixel separation region.

3. The imaging element according to claim 1, wherein the measurement part measures an amount of charges transferred from the photoelectric conversion part to the accumulation part via the transfer path part.

4. The imaging element according to claim 1, wherein the comparator is configured of two transistors including a first transistor to which the first input terminal is connected and a second transistor to which the second input terminal is connected.

5. The imaging element according to claim 1, further comprising an accumulation amount selection part configured to select a capacitance of the accumulation part from a plurality of capacitances, wherein the accumulation amount selection part selects different capacitances according to whether the number of times a predetermined amount of charges is accumulated in the accumulation part or the amount of charges accumulated in the photoelectric conversion part is measured.

6. The imaging element according to claim 1, wherein after the number of times a predetermined amount of charges is accumulated in the accumulation part is measured, the measurement part measures the amount of charges accumulated in the accumulation part before the amount of charges accumulated in the photoelectric conversion part is measured.

7. The imaging element according to claim 1, wherein the measurement part outputs a value obtained by adding the amount of charges accumulated in the photoelectric conversion part and the amount of charges accumulated in the accumulation part to the photoelectric conversion part as an amount of light converted into charges.

8. The imaging element according to claim 1, wherein a potential of a ground point of a chip provided with the photoelectric conversion part is lower than a potential of a ground point of a chip provided with the measurement part.

9. The imaging element according to claim 1, wherein the signal based on the number of times the predetermined amount of charges is accumulated in the accumulation part measured by the measurement part is output, and then the signal based on the amount of charges accumulated in the photoelectric conversion part measured by the measurement part is output within one frame period.

10. The imaging element according to claim 1, further comprising an adder part configured to add the signal based on the number of times the predetermined amount of charges is accumulated in the accumulation part measured by the measurement part and the signal based on the amount of charges accumulated in the photoelectric conversion part measured by the measurement part within one frame period.

11. An imaging device comprising the imaging element according to claim 1.

12. An imaging element comprising:

a photoelectric conversion part configured to convert light into charges;

an accumulation part in which the charges from the photoelectric conversion part are accumulated;

a transfer path part which is a transfer path for transferring charges from the photoelectric conversion part to the accumulation part and has a lower potential than a pixel separation region formed around the photoelectric conversion part; and a measurement part configured to measure the number of times a predetermined amount of charges is accumulated in the accumulation part and to measure an amount of charges accumulated in the photoelectric conversion part, wherein (i) a signal based on the number of times the predetermined amount of charges is accumulated in the accumulation part measured by the measurement part and (ii) a signal based on the amount of charges accumulated in the photoelectric conversion part measured by the measurement part are output within one frame period, and wherein the imaging element further comprises an adder part configured to add the signal based on the number of times the predetermined amount of charges is accumulated in the accumulation part measured by the measurement part and the signal based on the amount of charges accumulated in the photoelectric conversion part measured by the measurement part within one frame period.

13. The imaging element according to claim 12, wherein the transfer path part is a region having a lower impurity concentration than in the pixel separation region.

14. The imaging element according to claim 12, further comprising a comparator including a first input terminal connected to the accumulation part, a second input terminal to which a predetermined reference potential is applied, and an output terminal which outputs a potential based on a potential of the first input terminal and a potential of the second input terminal, wherein the measurement part changes a potential applied to the first input terminal and measures the amount of charges accumulated in the photoelectric conversion part on the basis of a time until the potential of the output terminal changes.

15. The imaging element according to claim 14, wherein the comparator is configured of two transistors including a first transistor to which the first input terminal is connected and a second transistor to which the second input terminal is connected.

16. The imaging element according to claim 12, wherein the measurement part measures an amount of charges transferred from the photoelectric conversion part to the accumulation part via the transfer path part.

17. The imaging element according to claim 12, further comprising an accumulation amount selection part configured to select a capacitance of the accumulation part from a plurality of capacitances, wherein the accumulation amount selection part selects different capacitances according to whether the number of times a predetermined amount of charges is accumulated in the accumulation part or the amount of charges accumulated in the photoelectric conversion part is measured.

18. The imaging element according to claim 12, wherein after the number of times a predetermined amount of charges is accumulated in the accumulation part is measured, the measurement part measures the amount of charges accumulated in the accumulation part before the amount of charges accumulated in the photoelectric conversion part is measured.

19. The imaging element according to claim 12, wherein the measurement part outputs a value obtained by adding the amount of charges accumulated in the photoelectric conversion part and the amount of charges accumulated in the accumulation part to the photoelectric conversion part as an amount of light converted into charges.

20. The imaging element according to claim 12, wherein a potential of a ground point of a chip provided with the photoelectric conversion part is lower than a potential of a ground point of a chip provided with the measurement part.

21. The imaging element according to claim 12, wherein the signal based on the number of times the predetermined amount of charges is accumulated in the accumulation part measured by the measurement part is output, and then the signal based on the amount of charges accumulated in the photoelectric conversion part measured by the measurement part is output within one frame period.

22. An imaging device comprising the imaging element according to claim 12.

* * * * *